United States Patent
Stirling-Gallacher et al.

(10) Patent No.: US 10,420,109 B2
(45) Date of Patent: *Sep. 17, 2019

(54) SYSTEM AND METHOD FOR PROVIDING EXPLICIT FEEDBACK IN COMMUNICATIONS SYSTEMS WITH MULTI-POINT CONNECTIVITY

(71) Applicant: Futurewei Technologies, Inc., Plano, TX (US)

(72) Inventors: Richard Stirling-Gallacher, San Diego, CA (US); Bin Liu, San Diego, CA (US); Lili Zhang, Beijing (CN); Nathan Edward Tenny, Poway, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/487,012

(22) Filed: Apr. 13, 2017

(65) Prior Publication Data
US 2018/0302888 A1    Oct. 18, 2018

(51) Int. Cl.
*H04W 4/00* (2018.01)
*H04W 72/04* (2009.01)
(Continued)

(52) U.S. Cl.
CPC .......... *H04W 72/046* (2013.01); *H04B 7/022* (2013.01); *H04B 7/0617* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 9,385,853 B2 * 7/2016 Zhou .................. H04B 7/024
2012/0314679 A1 12/2012 Lee et al.
(Continued)

FOREIGN PATENT DOCUMENTS

| CN | 102771070 A | 11/2012 |
| CN | 106160807 A | 11/2016 |
| WO | 2016023227 A1 | 2/2016 |

OTHER PUBLICATIONS

Huawei, et al., "UL SRS Design for CSI Acquisition and Beam Management," 3GPP TSG RAN WG1, Meeting #87, R1-1611678, Agenda Item 7.1.3.2, Reno, Nevada, Nov. 14-18, 2016, 5 pages.
(Continued)

*Primary Examiner* — Siren Wei
(74) *Attorney, Agent, or Firm* — Slater Matsil, LLP

(57) ABSTRACT

A method for transmitting feedback includes receiving feedback configuration information for explicit channel feedback for a plurality of transmit beam-receive beam combinations (TRBCs) between the user device and transmit-receive points (TRPs) of a multi-point set associated with the user device, generating the explicit channel feedback for the plurality of TRBCs, generating at least one modified uplink resource for each TRP in a subset of the TRPs of the multi-point set, the modified uplink resources are generated in accordance with the feedback configuration information, the modified uplink resources are configured to convey the explicit channel feedback to the subset of TRPs of the multi-point set, and transmitting the modified uplink resources to the subset of the TRPs of the multi-point set, where the at least one modified uplink resource associated with a TRP in the subset of the TRPs is transmitted to the TRP using a single TRBC.

26 Claims, 11 Drawing Sheets

(51) Int. Cl.
*H04L 5/00* (2006.01)
*H04B 7/06* (2006.01)
*H04B 7/022* (2017.01)
*H04B 7/08* (2006.01)

(52) U.S. Cl.
CPC ......... *H04B 7/0619* (2013.01); *H04B 7/0695* (2013.01); *H04B 7/088* (2013.01); *H04L 5/0035* (2013.01); *H04L 5/0053* (2013.01); *H04W 72/042* (2013.01)

(56) References Cited

U.S. PATENT DOCUMENTS

| | | | |
|---|---|---|---|
| 2013/0155847 A1* | 6/2013 | Li | H04W 24/04 370/225 |
| 2013/0182683 A1 | 7/2013 | Seol et al. | |
| 2014/0022924 A1* | 1/2014 | Cili | H04W 24/08 370/252 |
| 2014/0119278 A1* | 5/2014 | Balraj | H04B 7/0456 370/328 |
| 2014/0307654 A1* | 10/2014 | Kim | H04B 7/0617 370/329 |
| 2015/0110210 A1* | 4/2015 | Yang | H04B 7/0417 375/267 |
| 2015/0139101 A1* | 5/2015 | Guo | H04L 5/0035 370/329 |
| 2017/0150487 A1 | 5/2017 | Zhou et al. | |
| 2017/0208494 A1* | 7/2017 | Moon | H04W 24/10 |
| 2017/0215117 A1 | 7/2017 | Kwon et al. | |
| 2018/0115355 A1 | 4/2018 | Nagata et al. | |
| 2018/0167116 A1 | 6/2018 | Rahman et al. | |
| 2018/0278315 A1 | 9/2018 | Wu et al. | |

OTHER PUBLICATIONS

Catt, "Discussion on beam reporting," 3GPP TSG RAN WG1 Meeting #88, Agenda Item 8.1.2.2.1, R1-1702077, Athens, Greece, Feb. 13-17, 2017, 5 pages.

* cited by examiner

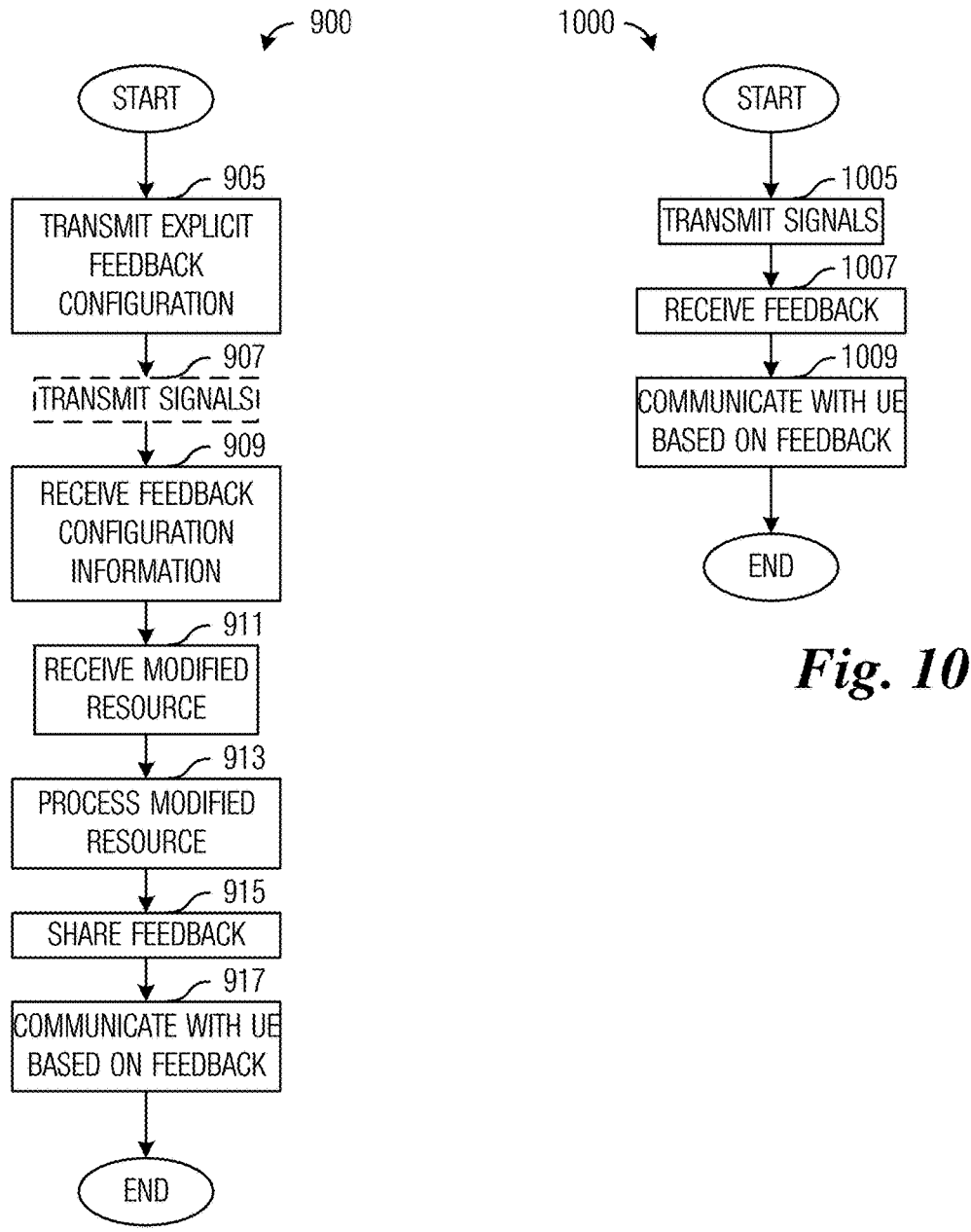

SYSTEM AND METHOD FOR PROVIDING EXPLICIT FEEDBACK IN COMMUNICATIONS SYSTEMS WITH MULTI-POINT CONNECTIVITY

TECHNICAL FIELD

The present disclosure relates generally to a system and method for digital communications, and, in particular embodiments, to a system and method for providing explicit feedback in communications systems with multi-point (MP) connectivity.

BACKGROUND

Many modern cellular communications systems (i.e., Third Generation Partnership Project (3GPP) Long Term Evolution Advanced (LTE-A) compliant communications systems) use uplink sounding, commonly referred to as sounding reference signals (SRS), from a user equipment (UE) to an access node to allow the access node to obtain an estimate of the uplink channel between the UE and the access node. Uplink sounding is often used in time division duplexed (TDD) communications systems that allow the access node to use channel reciprocity to obtain estimates of a downlink channel between the access node and the UE from the estimated uplink channel.

In communications systems that are link-budget limited (such as communications systems operating above 6 GHz, e.g., millimeter wave (mmWave) communications systems) the reference signals would need to be beamformed (at a transmitting device and a receiving device) to meet performance requirements in an operating environment with high path-loss. Therefore, a UE would have to transmit a large number of SRS symbols in order to facilitate channel estimation between each transmit antenna (or port) and each receive antenna at each access node. The transmissions of the large numbers of SRS would significantly impact overall communications system performance by consuming a large amount of beamformed uplink resources as overhead. This problem is especially a problem in configurations with limited uplink resources.

Multi-point (MP) communications is a communications technique used in many modern cellular communications systems to help improve overall communications system performance, increase resource utilization, and improve user experience. MP communications involves coordinated transmission and/or reception with multiple geographically separated access nodes. Coordination enables joint scheduling and transmissions as well as joint processing of received signals. It is noted that the issues presented above regarding the transmission of large numbers of SRS is significantly magnified in an environment utilizing MP communications.

SUMMARY

Example embodiments provide a system and method for providing explicit feedback in communications systems with multi-point (MP) connectivity.

In accordance with an example embodiment, a method for transmitting feedback in a MP deployment is provided. The method includes receiving, by a user device, feedback configuration information for explicit channel feedback for a plurality of transmit beam-receive beam combinations (TRBCs) between the user device and transmit-receive points (TRPs) of a MP set associated with the user device, generating, by the user device, the explicit channel feedback for the plurality of TRBCs, generating, by the user device, at least one modified uplink resource for each TRP in a subset of the TRPs of the MP set, the modified uplink resources are generated in accordance with the feedback configuration information, the modified uplink resources are configured to convey the explicit channel feedback to the subset of TRPs of the MP set, and transmitting, by the user device, the modified uplink resources to the subset of the TRPs of the MP set, where the at least one modified uplink resource associated with a TRP in the subset of the TRPs is transmitted to the TRP using a single TRBC.

The method also includes transmitting, by the user device, feedback configuration information to each TRP in the subset of the TRPs, the feedback configuration information including a user device communications beam to TRP communications beam mapping for the TRP. When the subset of the TRPs is smaller than a total number of TRPs in the MP set, the feedback configuration information for at least one TRP in the subset of the TRPs includes a user device communications beam to TRP communications beam mapping for more than one TRP. The feedback configuration information is received from one of: a master TRP of the MP set, one of the TRPs of the MP set, a legacy macro evolved NodeB (eNB) in a dual-connectivity deployment, a low frequency eNB, more than one of the TRPs of the MP set, or a master gNode B (MgNB).

When the feedback configuration information is received from more than one of the TRPs of the MP set, the method further includes applying, by the user device, one or more precedence rules to the feedback configuration information to determine an ordering of the feedback configuration information. The modified uplink resources are one of a modified sounding reference signal (SRS) resource or a modified uplink physical resource block (PRB). The feedback configuration information indicates a number of receive communications beams at the user device for which the user device is to generate explicit channel feedback for each TRP in the MP set. The feedback configuration information further indicates, for each TRP in the MP set, one of a first set of transmit communications beams of the TRP for which the user device is able to selectively generate explicit channel feedback or a second set of transmit communications beams of the TRP from which the user device must generate channel feedback.

When the feedback configuration information further indicates, for each TRP in the MP set, a first set of transmit communications beams of the TRP from which the user device is able to selectively generate channel feedback, the method further includes transmitting, by the user device, feedback configuration information including, for each TRP in the MP set, one or more transmit communications beams of the TRP selected by the user device. The feedback configuration information further indicates a set of receive communications beams at the user device for which the user device is to generate explicit channel feedback for each TRP in the MP set.

In accordance with an example embodiment, a method for operating a TRP operating in a MP set is provided. The method includes receiving, by the TRP, at least one modified uplink resource over a single TRBC, the modified uplink resource conveying explicit channel feedback associated with a first plurality of TRBCs between a user device and the TRP, and processing, by the TRP, the at least one modified uplink resource to produce channel feedback.

When the modified uplink resource further conveys explicit channel feedback associated with a second plurality of TRBCs between the user device and at least one other TRP, and the method further includes forwarding, by the TRP, channel feedback associated with the at least one other TRP to the at least one other TRP. The method also includes receiving, by the TRP, feedback configuration information including a user device selection of TRP communications beam mapping for the TRP. Processing the at least one modified uplink resource is in accordance with the user device selection of TRP communications beam mapping.

The method also includes transmitting, by the TRP, feedback configuration information indicating a number of receive communications beams of the user device for which the user device is to generate explicit channel feedback. The feedback configuration information further indicates, for each one of the TRP, one of a first set of transmit communications beams of the TRP to select from when generating explicit channel feedback or a second set of transmit communications beams of the TRP to generate channel feedback for. The feedback configuration information additionally signals a set of receive communications beams at the user device for which the user device is to generate explicit channel feedback for each TRP in the MP set.

In accordance with an example embodiment, a user device adapted to transmit feedback in a MP deployment is provided. The user device includes a processor, and a computer readable storage medium storing programming for execution by the processor. The programming including instructions to configure the user device to receive feedback configuration information for explicit channel feedback for a plurality of TRBCs between the user device and TRPs of a MP set associated with the user device, generate the explicit channel feedback for the plurality of TRBCs, generate at least one modified uplink resource for each TRP in a subset of the TRPs of the MP set, the modified uplink resources are generated in accordance with the feedback configuration information, the modified uplink resources are configured to convey the explicit channel feedback to the subset of TRPs of the MP set, and transmit the modified uplink resources to the subset of the TRPs of the MP set, where the at least one modified uplink resource associated with a TRP in the subset of the TRPs is transmitted to the TRP using a single TRBC.

The programming includes instructions to configure the user device to transmit feedback configuration information to each TRP in the subset of the TRPs, the feedback configuration information including a user device communications beam to TRP communications beam mapping for the TRP. The feedback configuration information indicates a number of receive communications beams at the user device for which the user device is to generate explicit channel feedback for each TRP in the MP set. The feedback configuration information further indicates, for each TRP in the MP set, one of a first set of transmit communications beams of the TRP for which the user device is able to selectively generate explicit channel feedback or a second set of transmit communications beams of the TRP from which the user device must generate channel feedback. The feedback configuration information further indicates, for each TRP in the MP set, a first set of transmit communications beams of the TRP from which the user device is able to selectively generate channel feedback, and wherein the programming includes instructions to configure the user device to transmit feedback configuration information including, for each TRP in the MP set, one or more transmit communications beams of the TRP selected by the user device.

In accordance with an example embodiment, a TRP operating in a MP deployment is provided. The TRP includes a processor, and a computer readable storage medium storing programming for execution by the processor. The programming including instructions to configure the TRP to receive at least one modified uplink resource over a single TRBC, the modified uplink resource conveying explicit channel feedback associated with a first plurality of TRBCs between a user device and the TRP, and process the at least one modified uplink resource to produce channel feedback.

The programming includes instructions to configure the TRP to receive feedback configuration information including a user device selection of TRP communications beam mapping for the TRP. The programming includes instructions to configure the TRP to transmit feedback configuration information indicating a number of receive communications beams of the user device for which the user device is to generate explicit channel feedback. When the modified uplink resource further conveys explicit channel feedback associated with a second plurality of TRBCs between the user device and at least one other TRP, the programming includes instructions to configure the TRP to forward channel feedback associated with the at least one other TRP to the at least one other TRP.

Practice of the foregoing embodiments enables the transmission of the combination of downlink channel responses from the access node to the UE using the best uplink beam combination in a MP communications environment. This results in improved performance because: the downlink channel responses are transmitted with the best signal to noise ratio (SNR) available in the uplink direction; reduced latency due to elimination of the need to switch between transmission beams at the UE; the UE does not have to switch radio frequency (RF) circuits, if the number of receiving and transmitting chains on the UE are different; and in deployments where the UE is providing feedback to a subset of transmit-receive points (TRPs), configuration information for each TRP associated with the feedback is provided, thereby enabling processing of the feedback at the TRPs (even those not receiving the feedback).

Practice of the foregoing embodiments enables a reduction in the spatial footprint of beamformed feedback signal. As an example, because only one UE to TRP beamformed link is used to transmit beamformed feedback for a plurality of TRPs, the amount of interference generated is potentially much smaller than when multiple UE to TRP links are used to transmit beamformed feedback.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates a flow diagram of example operations occurring in a TRP as the TRP communicates with a UE, where the TRP is part of a subset of TRPs configured to receive feedback from the UE according to example embodiments described herein;

FIG. 10 illustrates a flow diagram of example operations occurring in a TRP as the TRP communicates with a UE, where the TRP is not part of a subset of TRPs configured to receive feedback from the UE according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
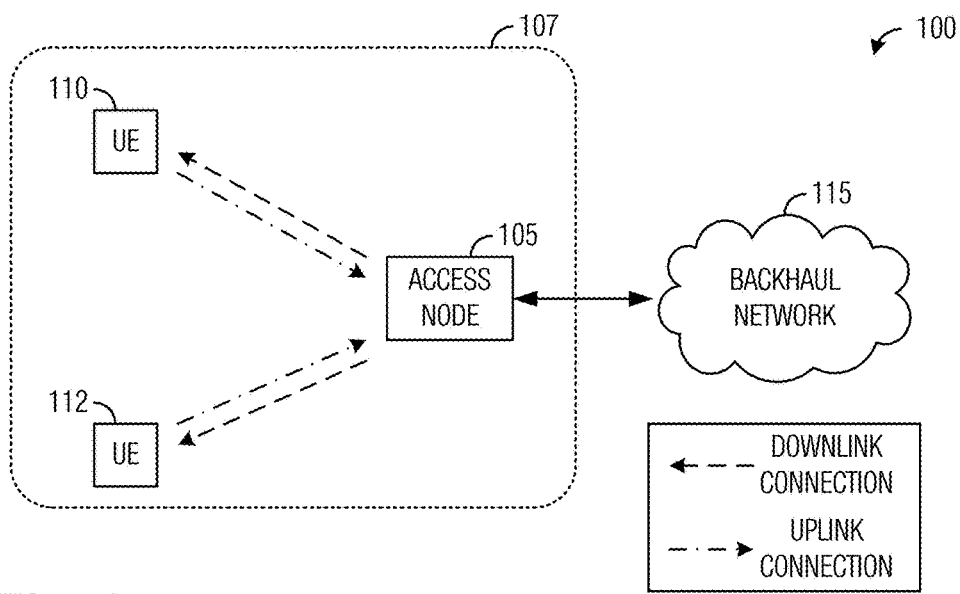
FIG. 1 illustrates an example wireless communications system according to example embodiments described herein.

FIG. 1 illustrates an example wireless communications system 100. Communications system 100 includes an access node 105 with a coverage area 107. Access node 105 serves a plurality of user equipments (UEs), including UE no and UE 112. As shown in FIG. 1, Access node 105 establishes downlink (dashed lines) and uplink (dashed dotted lines) connections with the UEs. The downlink connections carry data from access node 105 to the UEs and the uplink connections carry data from the UEs to access node 105.

Data carried over the downlink/uplink connections may include data communicated between the UEs and services (not shown) by way of a backhaul network 115. Wireless access may be provided in accordance with one or more wireless communications protocols, e.g., the Third Generation Partnership Project (3GPP) Long Term Evolution (LTE), LTE Advanced (LTE-A), high speed packet access (HSPA), IEEE 802.11, and so on. While it is understood that communications systems may employ multiple access nodes capable of communicating with a number of UEs, only one access node, and two UEs are illustrated for simplicity.

Access nodes may refer to evolved NodeBs (eNBs), g NodeBs (gNBs), base stations, NodeBs, master eNBs (MeNBs), secondary eNBs (SeNBs), master gNBs (MgNBs), secondary gNBs (SgNBs), remote radio heads, access points, while UEs may refer to mobiles, mobile stations, stations, terminals, subscribers, users, and the like. A transmission point (TP) may be considered to be a device sending a transmission, and a reception point (RP) may be considered to be a device receiving the transmission. A single device may be both a transmission point and a reception point for different transmissions; such a device is referred to as a transmit-receive point (TRP). Access nodes may be TRPs. In some situations, UEs may also be TRPs.

In 3GPP LTE communications systems, UEs transmit sounding reference signals (SRSs) to the TRPs so that the TRPs may estimate the complex channel response of the uplink channels and then by utilizing the channel reciprocity relationship an estimate of the complex channel response of the downlink channel can be determined. The estimated channel responses may be used to determine communications beams at the TRP with which to transmit downlink transmissions to the UEs and/or to receive uplink transmissions from the UEs. As used herein, the term communications beam refers to a set of beamforming weights (e.g., amplitude and/or phase shifts for antenna elements of an antenna array) that are used for directional signal and/or reception.

Unlike in 3GPP LTE communications systems, beamforming in millimeter wave (mmWave) communications systems may generally be performed by both the TRPs and the UEs in order to achieve commercially acceptable levels of throughput and range over the higher carrier frequencies. Accordingly, SRS transmission schemes for mmWave communications systems may need to identify communications beams to be used by both the UEs and the TRPs to reduce SRS sounding overhead.

A beam may be a pre-defined set of beamforming weights in the context of codebook-based precoding or a dynamically defined set of beamforming weights in the context of non-codebook based precoding (e.g., Eigen-based beamforming (EBB)). It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Simply sounding in every possible transmit-receive communications beam combination would result in too much SRS sounding overhead, negatively impacting communications performance and efficiency. According to the simple SRS sounding technique, a UE performs SRS transmissions according to different transmit beam directions from a set of transmit beam directions available to the UE, and the TRP receives the beamformed SRS transmissions from the UE according to different receive beam directions from a set of receive beam directions available to the TRP. The TRP estimates the complex channel responses for the uplink channels based on the received SRS transmissions and determines the estimates for the corresponding downlink channels. The estimates may be used to determine which communications beams the TRP uses to transmit downlink signals as well as which beam directions the UE uses to receive the downlink signals.

It is noted that the channel in mmWave communications systems are spatially sparse and that only a few spatial directions are significant. Due to the high path loss, mmWave communications beams are easily blocked and reflected signals are subject to high reflection losses (on the order of 10-25 dB) as well as extra path loss to reach the receiver. Therefore, in most situations only communications beams that are directly (or substantially directly) oriented towards a device have adequately high signal to noise ratios (SNRs) to support good throughput. The communications beams with adequately high SNRs are referred to as significant communications beams.

Figure 2:
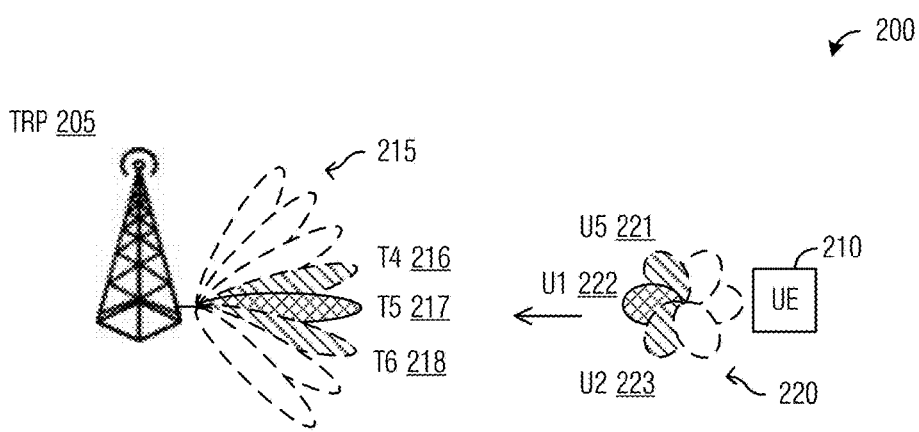
FIG. 2 illustrates an example communications system highlighting significant communications beams according to example embodiments described herein.

FIG. 2 illustrates an example communications system 200 highlighting significant communications beams. Communications system 200 includes a TRP 205 serving a UE 210. TRP 205 may perform beamformed communications using a set of communications beams 215 (a portion of which is shown in FIG. 2). Similarly, UE 210 communicates using a set of communications beams 220. Although there are many available communications beams in set of communications beams 215 and set of communications beams 220, due to the high path loss nature of mmWave channels, only a subset of the available communications beams are significant. As an example, only TRP communications beam #T4 216, TRP communications beam #T5 217, and TRP communications beam #T6 218, which are oriented directly or substantially directly towards UE 210 are significant receive beams. While, only UE communications beam #U1 222, UE communications beam #U2 223, and UE communications beam #U5 221, which are oriented directly or substantially directly towards TRP 205 are significant transmit beams. Each combination of transmit communications beam to receive communications beam is referred to as a transmit-receive beam combination (TRBC).

It is further noted that even among the significant communications beams, only a subset of the possible TRBCs of the significant communications beams are significant. As an illustrative example, the combination of UE communications beam #U1 222 and TRP communications beam #T5 217 are significant, as is the combination of UE communications beam #U2 223 and TRP communications beam #T6 218. However, the combination of UE communications beam #U5 221 and TRP communications beam #T6 218 may not be significant due to their orientations. Similarly, the combination of UE communications beam #U2 223 and TRP communications beam #T4 216 may not be significant.

Explicit feedback is a feedback technique whereby the received channel estimate in one direction, (i.e., downlink) is explicitly fed back to the transmitter. One way to perform explicit feedback is analog feedback. Analog feedback is a known feedback technique wherein information or a representation of the measured channel, such as fading coefficients, is fed back using an analog transmission technique. Explicit feedback has been proposed for use in multi-user multiple input multiple output (MU-MIMO) and interference channel (IC) scenarios. Therefore, explicit feedback is seen as a viable way to provide feedback, especially in situations when the feedback overhead is large.

Systems and methods for providing explicit channel feedback in the uplink between a UE and a TRP using modified uplink resources are presented in a co-assigned U.S. patent application Ser. No. 15/448,102, filed Mar. 2, 2017, entitled "System and Method for Providing Explicit Feedback in the Uplink," which is hereby incorporated herein by reference.

Figure 3:
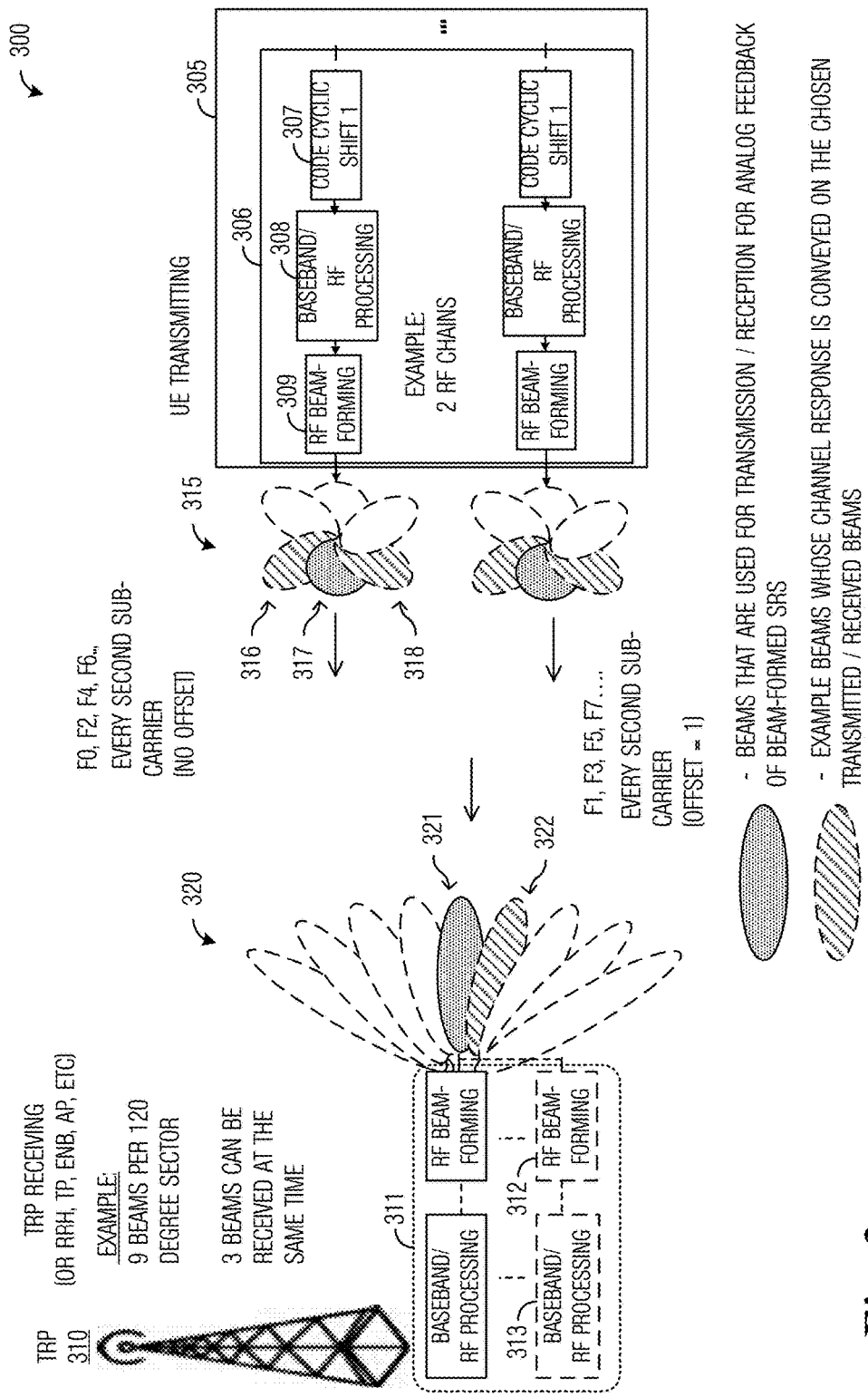
FIG. 3 illustrates a communications system highlighting the transmission of explicit channel feedback on a best TRBC per RF chain according to example embodiments described herein.

FIG. 3 illustrates a communications system 300 highlighting the transmission of explicit channel feedback on a best TRBC per RF chain. The explicit channel feedback is a representation of the downlink (TRP to UE) complex channel response. Communications system 300 includes a UE 305 and a TRP 310. UE 305 has transmit RF circuitry 306 with two RF chains, with each RF chain including cyclic shift (such as cyclic shift 307), a baseband/RF processor (such as baseband/RF processor 308), and a RF precoder (such as precoder 309). TRP 310 includes receive RF circuitry 311 with a plurality of RF chains, with each RF chain including a RF beamforming unit (such as RF beamforming unit 312) and a baseband/RF processor (such as baseband/RF processor 313). UE 305 communicates using a set of communications beams, such as set of communications beams 315 and TRP 310 communicates using a set of communications beams 320, a portion of which is shown in FIG. 3. It is noted that although the two RF chains of UE 305 communicate using the same set of communications beams, due to the nature of the mmWave beams, some communications beams usable for communications by a first RF chain may not be usable by a second RF chain. Therefore, although the illustration presented in FIG. 3A displays the two RF chains using the same communications beams, different RF chains may use different communications beams in practice. Similarly, the different RF chains may also detect different communications beams of TRP 310. Hence, the discussion focusing on the two RF chains using the same communications beams at both UE 305 and TRP 310 should not be construed as being limiting to either the scope or the spirit of the example embodiments presented herein.

As discussed previously, the channel feedback for multiple TRBCs are transmitted using explicit feedback on a single TRBC. The single TRBC used to transmit the channel feedback is generally the best TRBC available.

Due to the relative positions of the UE and the TRP and the directional nature of beamformed communications, only subsets of the available communications beams are usually suitable for communications. As an example, UE communications beams 316, 317, and 318 of set of communications beams 315 and TRP communications beams 321 and 322 of set of communications beams 320 are suitable for communications between UE 305 and TRP 310 as shown in FIG. 3. Other communications beams are directed away from the UE or the TRP and any transmissions occurring over those communications beams are unlikely to reach the intended recipient.

As presented previously, due to the nature of mmWave channels, usually only the communications beams with the best orientation between the communications devices will have the best quality. As shown in FIG. 3, communications beams 317 and 321 are best oriented between UE 305 and TRP 310. Therefore, the combination of communications beams 317 and 321 is used to transmit the explicit channel feedback of the downlink channel (TRP to UE) for all TRBCs for the first RF chain. In other words, the combination of communications beams 317 and 321 is used to convey explicit channel feedback for other TRBCs in addition to the combination of communications beams 317 and 321.

Both RF chains of UE 305 are used to transmit the explicit channel feedback, with a first RF chain transmitting a first subset of the explicit channel feedback on every second subcarrier with no offset (such as subcarriers F0, F2, F4, F6, and so on) for its chosen TRBCs and a second RF chain transmitting a second subset of the explicit channel feedback on every second subcarrier with an offset of one (such as subcarriers F1, F3, F5, F7, and so on) for its chosen TRBCs.

Figure 4:
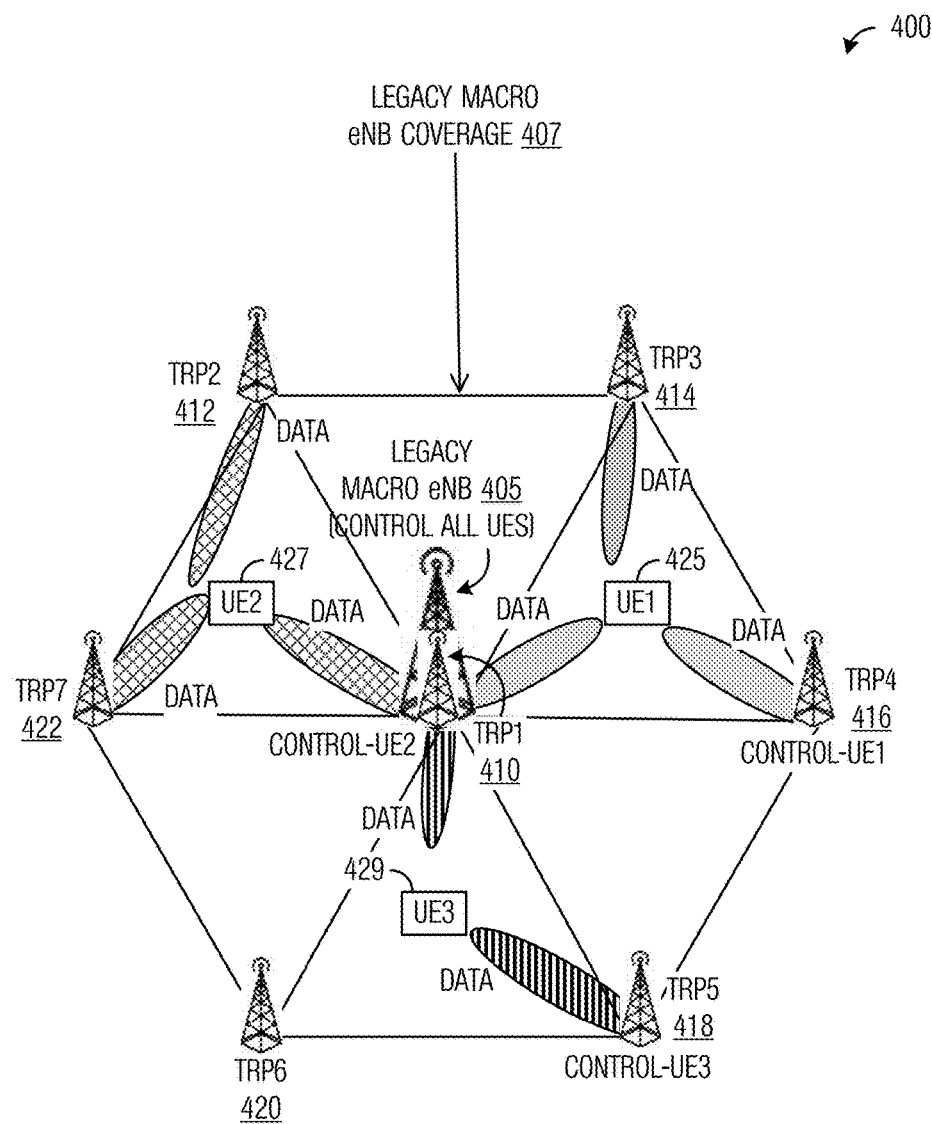
FIG. 4 illustrates an example communications system, highlighting multi-point (MP) communications according to example embodiments described herein.

FIG. 4 illustrates an example communications system 400, highlighting multi-point (MP) communications. As shown in FIG. 4, communications system 400 is a dual connectivity deployment and includes legacy low frequency service, as well as high frequency (e.g., mmWave frequency) service. Communications system 400 includes a legacy macro eNB 405 with coverage 407. Co-located with legacy macro eNB 405 is a first high frequency TRP "TRP1" 410. Legacy macro eNB 405 may provide legacy service at low frequencies, while TRP1 410 provides high frequency coverage. However, due to the higher pathloss at high frequencies, the coverage of TRP1 410 is relatively small compared to coverage 407. Therefore, to improve the coverage of the high frequency services, as well as to provide MP communications, communications system 400 includes additional high frequency TRPs, such as TRP2 412, TRP3 414, TRP4 416, TRP5 418, TRP6 420, and TRP7 422.

Communications system 400 also includes UEs, such as UE1 425, UE2 427, and UE3 429, located within coverage 407. The UEs located within coverage 407 may be controlled by legacy macro eNB 405. Potentially, the UEs located within coverage 407 are also controlled by one of the high frequency TRPs. As an illustrative example, UE1 425 is controlled by TRP4 416 (as well as legacy macro eNB 405), UE2 427 is controlled by TRP1 410 (as well as legacy macro eNB 405), and UE3 429 is controlled by TRPs 418 (as well as legacy macro eNB 405).

Although a UE may not be controlled by a high frequency TRP, the UE may still receive data from the high frequency TRP. As an illustrative example, UE1 425 receives data from TRP1 410, TRP3 414, and TRP4 416. Similarly, UE2 427 receives data from TRP1 410, TRP2 412, and TRP7 422, while UE3 429 receives data from TRP1 410 and TRPs 418. As shown in FIG. 4, communications beams with similar cross-hatching illustrate communications beams used to transmit data to a single UE. It is noted that the TRPs of communications system 400 are capable of using other communications beams, only the communications beams used to communicate with UE1 425, UE2 427, and UE3 429 are shown to maintain simplicity of the figure.

Figure 5A:
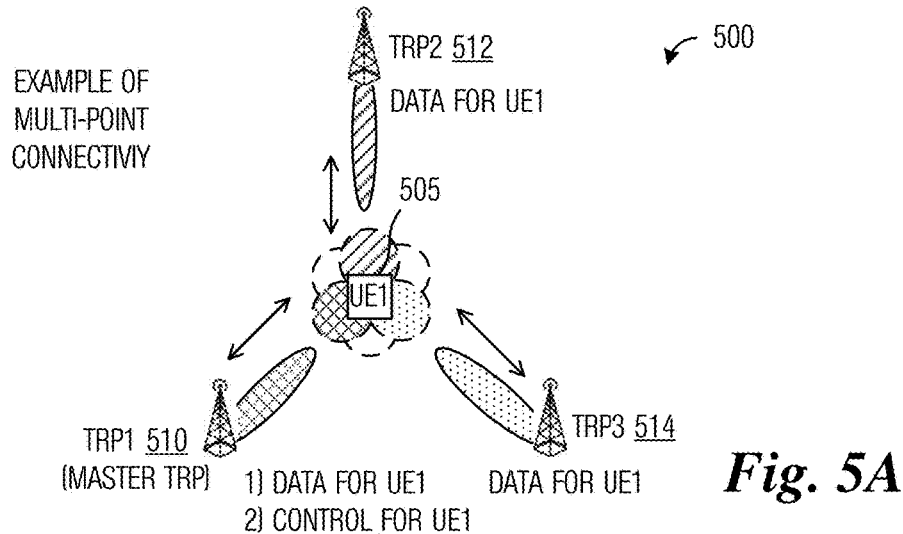
FIG. 5A illustrates a communications system highlighting MP connectivity according to example embodiments described herein.

FIG. 5A illustrates a communications system 500 highlighting MP connectivity. Communications system 500 includes a UE 505 and three TRPs (TRP1 510, TRP2 512, and TRP3 514). TRPs 510, 512, and 514 make up a MP set for UE 505. UE 505 and TRPs 510, 512, and 514 are utilizing MP connectivity. As an example of MP connectivity, TRPs 510, 512, and 514 transmit data to UE 505. In addition to transmitting data, TRP1 510 is also operating as a master TRP for the MP set of UE 505 and transmits control information to UE 505.

Figure 5B:
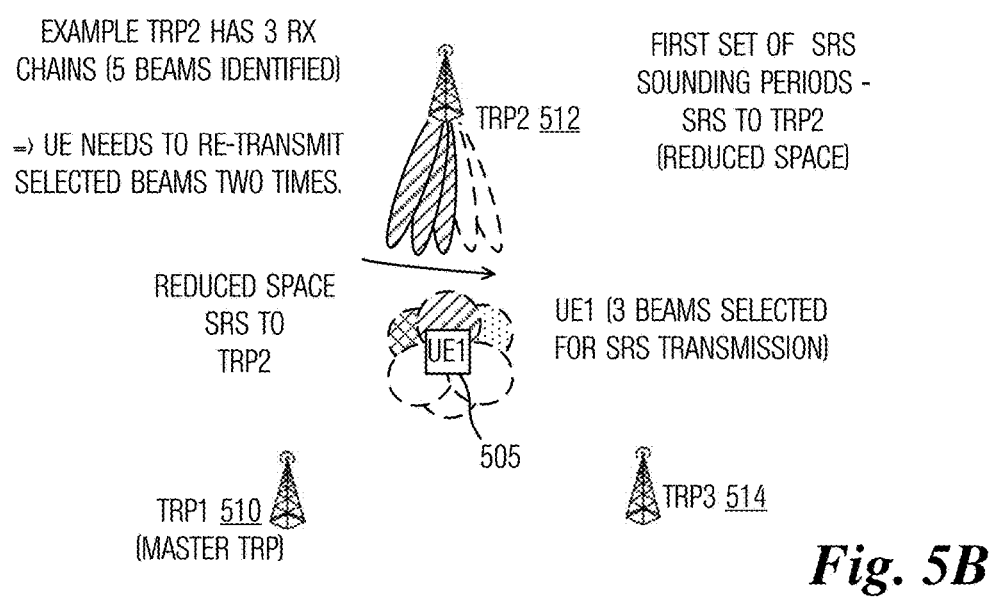
FIG. 5B illustrates a diagram highlighting a first SRS sounding period for communications system 500 shown in FIG. 5A according to example embodiments described herein.

FIG. 5B illustrates a diagram 520 highlighting a first SRS sounding period for communications system 500 shown in FIG. 5A. In the first SRS sounding period, UE 505 is transmitting SRS on a subset of its available communications beams to TRP2 512. As shown in FIG. 5B, UE 505 has three communications beams selected for SRS transmission, while TRP2 512 has a total of three receive chains (and thus can receive on up to three beams at the same time) with a total of five identified receive beams. Therefore, UE 505 has to retransmit the three selected communications beams a total of two times. As an example, in a first SRS transmission time, UE 505 uses the three cross-hatched transmit beams to transmit to TRP2 512, with TRP2 512 using the three cross-hatched receive beams. Then, in a second SRS transmission time, UE 505 also uses the three cross-hatched transmit beams to transmit to TRP2 512, with TRP2 512 using the two receive beams that are not shaded.

Figure 5C:
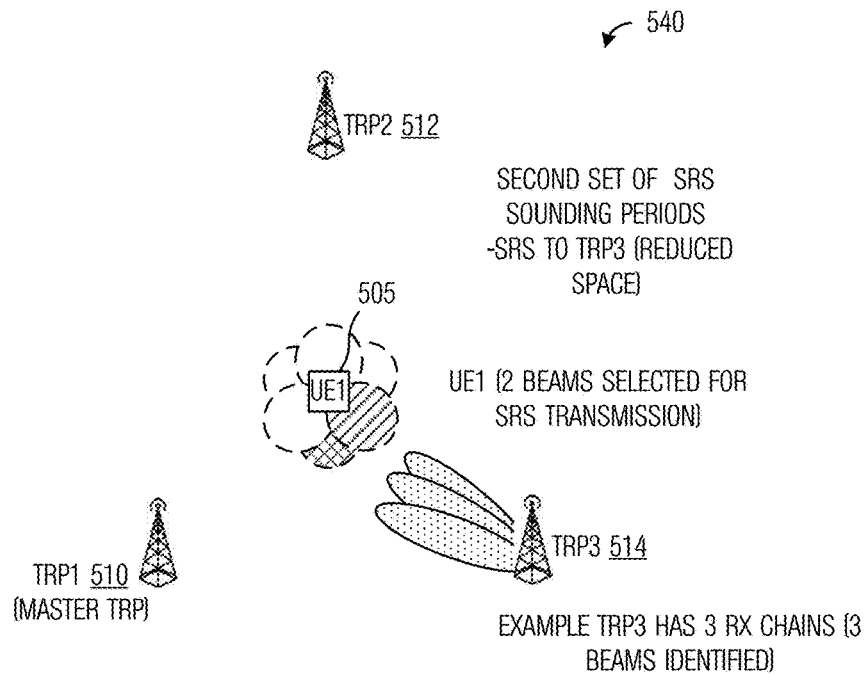
FIG. 5C illustrates a diagram highlighting a second SRS sounding period for communications system 500 shown in FIG. 5A according to example embodiments described herein.

FIG. 5C illustrates a diagram 540 highlighting a second SRS sounding period for communications system 500 shown in FIG. 5A. In the second SRS sounding period, UE 505 is transmitting SRS on a subset of its available communications beams to TRP3 514. As shown in FIG. 5C, UE 505 has two communications beams selected for SRS transmission, while TRP3 514 has a total of three receive chains with a total of three identified receive beams. Therefore, UE 505 has to transmit the two selected communications beams only one time. As an example, UE 405 uses the two cross-hatched transmit beams to transmit to TRP3 514, with TRP3 514 using the three cross-hatched receive beams.

Figure 5D:
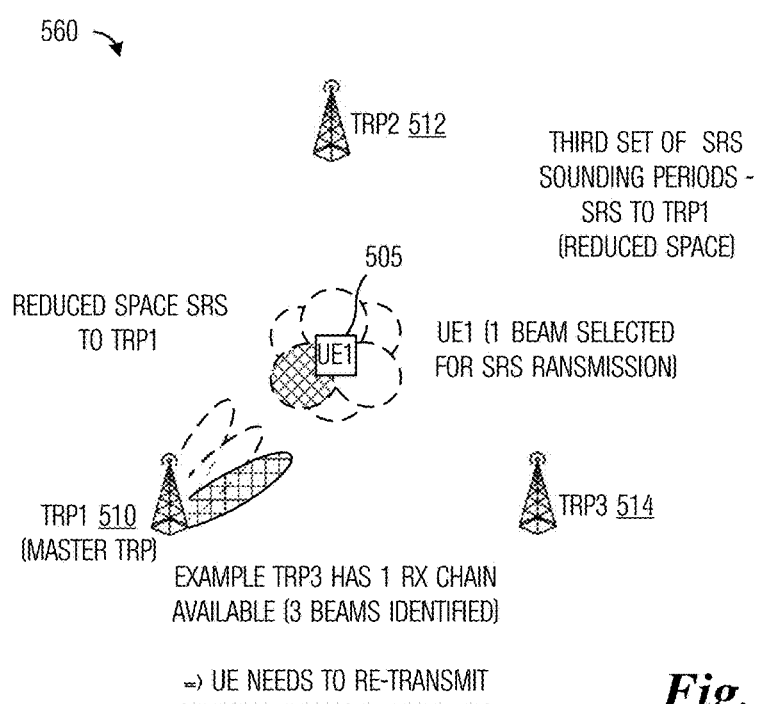
FIG. 5D illustrates a diagram highlighting a third SRS sounding period for communications system 500 shown in FIG. 5A according to example embodiments described herein.

FIG. 5D illustrates a diagram 560 highlighting a third SRS sounding period for communications system 500 shown in FIG. 5A. In the third SRS sounding period, UE 505 is transmitting SRS on a subset of its available communications beams to TRP1 510. As shown in FIG. 5D, UE 505 has one communications beam selected for SRS transmission, while TRP1 510 has a single receive chain with a total of three identified receive beams. Therefore, UE 505 has to transmit the one selected communications beam a total of three times. As an example, in a first SRS transmission time, UE 505 uses the one communications beam to transmit to TRP1 510, with TRP1 510 using the one cross-hatched receive beam. Then in each of the second and third SRS transmission times, UE 505 uses the one communications beam to transmit to TRP1 510 to transmit to one of the two unshaded receive beams.

According to an example embodiment, a system and method that uses explicit feedback in conjunction with beamformed uplink transmissions to convey downlink channel quality feedback in a MP environment are provided. The use of explicit feedback enables a UE to use a single transmit-receive beam combination per TRP to convey feedback for a plurality of TRBCs. In a first example embodiment, the UE transmits the explicit channel feedback to each TRP of the MP set of the UE separately. In other words, the UE uses a single TRBC associated with each UE-TRP pair in the MP set of the UE to convey explicit channel feedback for all TRBCs of the UE-TRP pair. In such an example embodiment, different modulated symbols are organized so that each TRP in the MP set of the UE is aware of a mapping of the modulated symbols to different UE-TRP TRBCs of its own TRBCs. In a second example embodiment, the UE transmits the explicit channel feedback for all TRBCs of all of the UE-TRP pairs to a subset of TRPs in the MP set of the UE. It is noted that the subset of TRPs may range from one TRP to all of the TRPs in the MP set of the UE. In addition to the TRPs having to be aware of the mapping of modulated symbols to different UE-TRP TRBCs, the TRPs that are actually receiving the explicit channel feedback (i.e., the TRPs in the subset of TRPs) also need to be aware of a mapping of the modulated symbols to different UE-TRP TRBCs of all TRPs. It is noted that multiple UEs and subbands may be multiplexed using code division multiplexing (CDM) and/or frequency division multiplexing (FDM).

As discussed in co-assigned patent application entitled "System and Method for Providing Explicit Feedback in the Uplink," the explicit channel feedback is transmitted using modified uplink resources. In a first example embodiment, the modified uplink resource is a modified uplink physical resource block (PRB), which typically for LTE already has two demodulation reference signals (DMRS) resources. In a second example embodiment, the modified uplink resource is a modified SRS resource.

According to a first example embodiment, configuration information of the mapping of modulated symbols to different UE-TRP TRBCs are provided from multiple sources. In the first example embodiment, the different TRPs of the MP set of the UE separately configure the transmission of the explicit channel feedback (from the UE to the separate TRPs) and also schedule the receptions of the modified uplink resources in a coordinated or orthogonal manner. Therefore, the UE transmitting beamformed modified uplink resources to a single TRP do not interfere with the reception of modified uplink resources or other uplink receptions at neighboring TRPs. Orthogonality of the modified uplink resources may achieved in a manner of different ways, including the assignment of the modified uplink resources to orthogonal resources (e.g., time resources, frequency resources, code resources, or a combination thereof) or by using zero-power SRS (ZP-SRS) resources.

According to a second example embodiment, a subset of TRPs of the MP set configures the transmission of the explicit channel feedback for all of the TRPs of the MP set, therefore, the UE only receives configuration information from a subset of TRPs. The configuration of the transmission of the explicit channel feedback by a subset of TRPs may simplify the achieving of interference-free transmission. A subset may range anywhere from one TRP of the MP set (such as a master TRP of the MP set) to all TRPs of the MP set. In the case where a subset can include all of the TRPs of the MP set, the second example embodiment is equivalent to the first example embodiment. According to a third example embodiment, in a communications system that supports dual-connectivity, a legacy macro eNB, a low frequency MeNB (LF MeNB), or a 5G MgNB configures the transmission of the explicit channel feedback for all of the TRPs of the MP set.

Figure 6A:
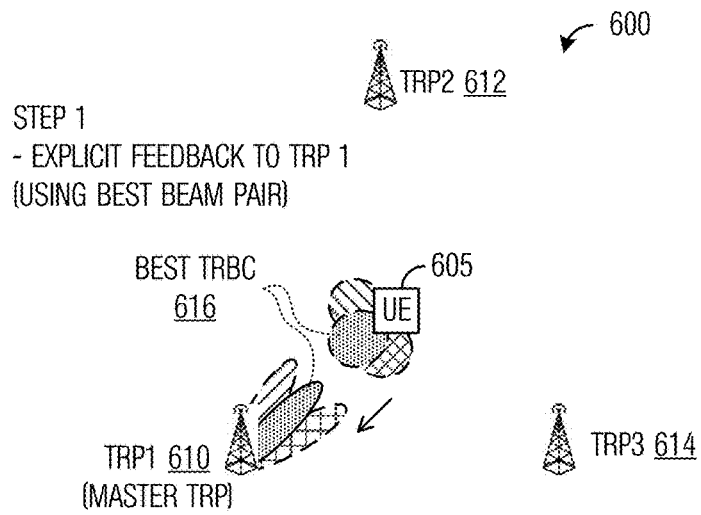
FIGS. 6A-6C illustrate the transmission of explicit channel feedback by a UE according to a first example embodiment according to example embodiments described herein.
Figure 6B:
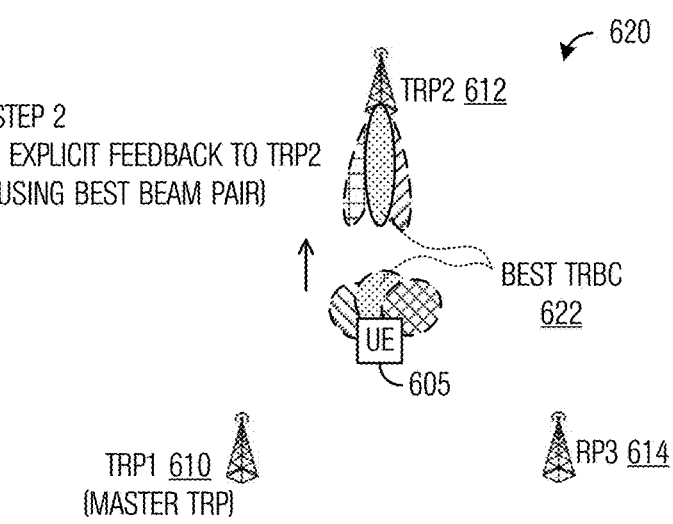
Figure 6C:
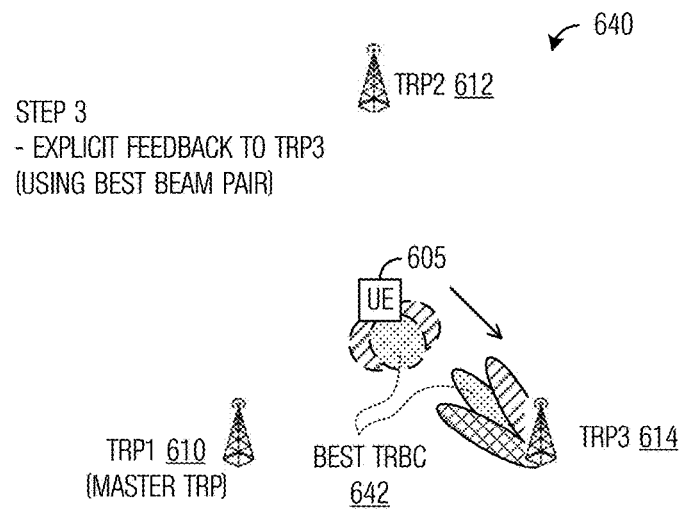

FIGS. 6A-6C illustrate the transmission of explicit channel feedback by a UE according to the first example embodiment. FIG. 6A illustrates a diagram 600 of a communications system in a first step of providing explicit feedback. The communications system includes a UE 605 that is being served by a plurality of TRPs, including TRP1 610, TRP2 612, and TRP3 614, with TRP1 610 operating as a master TRP. In the first step of providing explicit feedback, UE 605 is transmitting explicit feedback of TRBCs associated with UE 605 and TRP1 610 over a best TRBC (shown as best TRBC 616) between UE 605 and TRP1 610. FIG. 6B illustrates a diagram 620 of the communications system in a second step of providing explicit feedback. In the second step of providing explicit feedback, UE 605 is transmitting explicit feedback of TRBCs associated with UE 605 and TRP2 612 over a best TRBC (shown as best TRBC 622) between UE 605 and TRP2 612. FIG. 6C illustrates a diagram 640 of the communications system in a third step of providing explicit feedback. In the third step of providing explicit feedback, UE 605 is transmitting explicit feedback of TRBCs associated with UE 605 and TRP3 614 over a best TRBC (shown as best TRBC 642) between UE 605 and TRP3 614.

In a situation where a master TRP configures the transmission of the explicit channel feedback, if all of the TRPs of the MP set of the UE are connected to the same gNB (or eNB), the signaling and the modified uplink resource configuration sharing between the TRPs may be an implementation issue. However, if some of the TRPs of the MP set are connected to different gNBs (or SgNBs, SeNBs, etc), the signaling and the sharing of the modified uplink resource configuration may be transported over a standard interface, such as Xx or Xn interfaces, between the gNBs prior to the serving gNB can provide the configuration of the transmission of the explicit channel feedback to the TRPs for transmission to the UE.

In a situation where dual-connectivity is supported, a legacy macro eNB (or LF MeNB, a 5G MgNB, etc.) may configure the transmission of the explicit channel feedback. In such a situation, when some of the TRPs are served by different gNBs, signaling and sharing of the modified uplink resource configuration may be transported over a standard interface between the different gNBs. However, the gNBs do not have to provide the configuration of the transmission of the explicit channel feedback to the TRPs for transmission to the UE.

Figure 7:
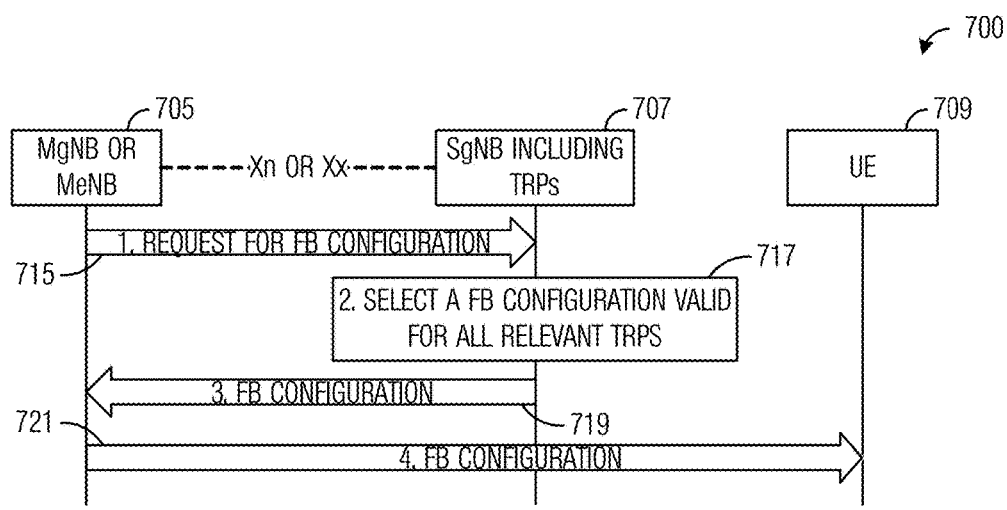
FIG. 7 illustrates a diagram of processing occurring at and messages transmitted by devices participating in configuring the transmission of the explicit channel feedback and the signaling thereof when the TRPs in the MP set are served by different gNBs according to example embodiments described herein.

FIG. 7 illustrates a diagram 700 of processing occurring at and messages transmitted by devices participating in configuring the transmission of the explicit channel feedback and the signaling thereof when the TRPs in the MP set are served by different gNBs. Diagram 700 displays the processing occurring at and messages transmitted by a MgNB (or MeNB) 705, a SgNB (including TRPs) 707, and a UE 709, as the devices participate in the configuring of the transmission of the explicit channel feedback.

MgNB 705 sends a request for explicit channel feedback configuration to SgNB 707 (event 715). SgNB 707 selects an explicit channel feedback configuration that is valid for the TRPs of the MP set of UE 709 (block 717). SgNB 707 sends the explicit channel feedback configuration to MgNB 705 (event 719). MgNB 705 sends the explicit channel feedback configuration to UE 709 (event 721).

Example explicit channel feedback configuration are as follows:

In a first configuration where the TRP configures the UE to perform feedback using either the modified SRS resource approach or the modified uplink PRB approach, for a specified number of UE and TRP communications beams with the UE being able to make the selection of both UE and TRP communications beams on its own, the TRP may provide to the UE the following configuration parameters:

TRP or UE specific parameters:
  Number of symbols and/or subframes per different UE communications beam, and
  Number of symbols and/or subframes for different TRP communications beam.
UE specific parameters:
  An indicator of PUCCH resources for each UE, for the reporting of UE chosen TRP communications beam index(s);

In a second configuration where the TRP configures the UE to perform feedback using either the modified SRS resource approach or the modified uplink PRB approach, for a number of UE communications beams while the TRP communications beams are specified by the TRP, the TRP may provide to the UE the following configuration parameters:

TRP or UE specific parameters:
  Number of symbols and/or subframes per different UE communications beam, and
  Number of symbols and/or subframes for different TRP communications beam.
UE specific parameters:
  Indices for each of the assigned TRP communications beams; and In a third configuration where the TRP configures the UE to perform feedback using either the modified SRS resource approach or the modified uplink PRB approach, for a number of UE communications beams and a set of TRP communications beams with the UE being able to make the selection of both UE and TRP communications beams on its own, but the TRP communications beams are selected only from the assigned set of TRP communications beams, the TRP may provide to the UE the following configuration parameters:

TRP or UE specific parameters:
　Number of symbols and/or subframes per different UE communications beam, and
　Number of symbols and/or subframes for different TRP communications beam.

UE specific parameters:
　Indices of TRP communications beams for the set of TRP communications beams, and
　An indicator of PUCCH resources for each UE, for UE reporting of the chosen TRP communications beam index(s).

In addition to the common configuration information as discussed above, additional configuration information may be provided by the TRP in the deployment using the modified SRS resource. The additional configuration information includes:

TRP specific SRS configuration
　Frequency comb spacing, e.g., 2, 4, and so on.
UE specific configuration
　UE specific subcarrier offset for the first RF chain of the frequency comb,
　UE specific code sequence or cyclic shift,
　UE specific SRS subframe sounding time or time offset, and
　UE specific mapping of subcarriers in a situation when the configuration discussed in the second illustrative example is used.

One way that the SRS configuration may be communicated to the UE is to use a combination of radio resource control (RRC) signaling and downlink control information (DCI) format signaling. However, due to the increased downlink bandwidth available in 5G high frequency (HF) communications systems, other options are possible. As an example, transmission of the configuration using purely DCI format signaling may be possible. Due to the range of connection possibilities available in 5G HF communications systems, rules may be established when the UE receives explicit channel feedback configuration from different sources (i.e., different TRPs or gNBs). Examples of such rules include:

1. The most recently received explicit channel feedback configuration takes precedence over previously received explicit channel feedback configurations;

2. UE specific explicit channel feedback configuration takes precedence over TRP specific explicit channel feedback configuration; and 3. Explicit channel feedback configurations received on actual carriers for which they are related take precedence over explicit channel feedback configurations received on carriers for which they are not related.

The rules may be used in combination in a specified way, for example, Rule 1 has higher priority than Rule 2, and so on, or the rules are used in isolation. The ordering (i.e., precedence) of the rules may change. The ordering or precedence may be specified in a technical standard or it may be dynamically changed.

A priority value may also be used to change the explicit channel feedback configuration, allowing the communications system to dynamically switch between the sources of the explicit channel feedback configuration. As an example, a one-bit priority value would allow for the coverage of two different sources of the explicit channel feedback configuration, while a two-bit priority value would allow for the coverage of four different sources of the explicit channel feedback configuration in a configuration message. In this manner, the UE would use the configuration with the highest assigned priority value and the communications system may be able to flexibly and dynamically change the source of the explicit channel feedback configuration as needed.

It is noted that the transmission of explicit channel feedback by a UE according to the second example embodiment may be similar to that shown in FIGS. 6A-6C, with an exception being that the UE does not have to transmit the explicit channel feedback to every TRP in the MP set. Instead, the UE transmits the explicit channel feedback to a subset of the TRPs in the MP set, which means that when the subset of the TRPs is smaller than all of the TRPs in the MP set, at least one TRP will receive explicit channel feedback for TRBCs that are not associated with the at least one TRP. In such a situation, the at least one TRP has knowledge of the explicit channel feedback configuration and may communicate the explicit channel feedback for TRBCs that are not associated with it to the appropriate TRP(s).

In addition to the different techniques for specifying and transmitting the explicit channel feedback configuration as discussed relating to the first example embodiment, additional techniques for specifying and transmitting the explicit channel feedback configuration are possible dependent upon if the TRPs of the MP set are distinguishable by the UE.

In deployments where the TRP or groups of TRPs are distinguishable by the UE, the selection of the TRP communications beams, the UE communications beams, and the signaling of the selection may be as follows:

i-When it is possible to signal the UE which TRPs to use.
　The UE has complete freedom to select TRP communications beams of each TRP, as well as respective UE communications beams (up to a configured communications beam set limit, e.g., X=maximum number of UE communications beams and Y=maximum number of TRP communications beams); and
　The UE signals the TRP communications beam choice using a control channel, such as a physical uplink control channel (PUCCH), for example.

ii-When it is possible to signal the UE which TRPs to use and a subset of TRP communications beams for each TRP.
　The UE chooses which TRP communications beams to select from the signaled subset of TRP communications beams, as well as respective UE communications beams; and
　The UE signals the TRP communications beam choice using a control channel, such as a PUCCH, for example.

iii-When it is possible to signal the UE which TRPs to use and which TRP communications beam of each TRP to use.
　The UE just chooses UE communications beams. No additional signaling is needed.

iv-When it is possible to allow the UE free choice to select the best TRPs and the communications beams for each TRP.
　The UE has complete freedom to select TRP communications beams, as well as respective UE communications beams (up to a configured communications beam set limit, e.g., X=maximum number of UE communications beams and Y=maximum number of TRP communications beams); and The UE signals the TRP and the TRP communications beam choice using a control channel, such as a PUCCH, for example.

v-When it is possible to signal the UE which UE beams to use.

This may be in conjunction with any of the options i-iv above, and the signaling of the UE depends on the option used; and The UE does not have to signal any information related to the UE communications beams.

In deployments where the TRP or groups of TRPs are not distinguishable by the UE, the selection of the TRP communications beams, the UE communications beams, and the signaling of the selection may be as follows:

vi-When it is possible to signal the UE the TRP communications beams to use, using a beam index, for example.

The UE just chooses UE communications beams. No additional signaling is needed.

vii-When it is possible to signal the UE a subset of TRP communications beams to use.

The UE chooses which TRP communications beams to select from the signaled subset of TRP communications beams, as well as respective UE communications beams; and The UE signals that TRP communications beam choice using a control channel, such as a PUCCH, for example.

viii-When it is possible to allow the UE free choice to select the best TRPs and the communications beams for each TRP.

The UE has complete freedom to select TRP communications beams, as well as respective UE communications beams (up to a configured communications beam set limit, e.g., X=maximum number of UE communications beams and Y=maximum number of TRP communications beams); and The UE signals the TRP and the TRP communications beam choice using a control channel, such as a PUCCH, for example.

ix.-When it is possible to signal the UE which UE beams to use.

This may be in conjunction with any of the options vi-viii above, and the signaling of the UE depends on the option used; and The UE does not have to signal any information related to the UE communications beams.

It is noted that for different communications beam selection and signaling presented herein, it may not be crucial for the TRP to know exactly which UE communications beams are used for each explicit channel feedback sounding opportunity, but the TRP may need to know which explicit channel feedback sounding opportunity uses different UE communications beams.

Figure 8:
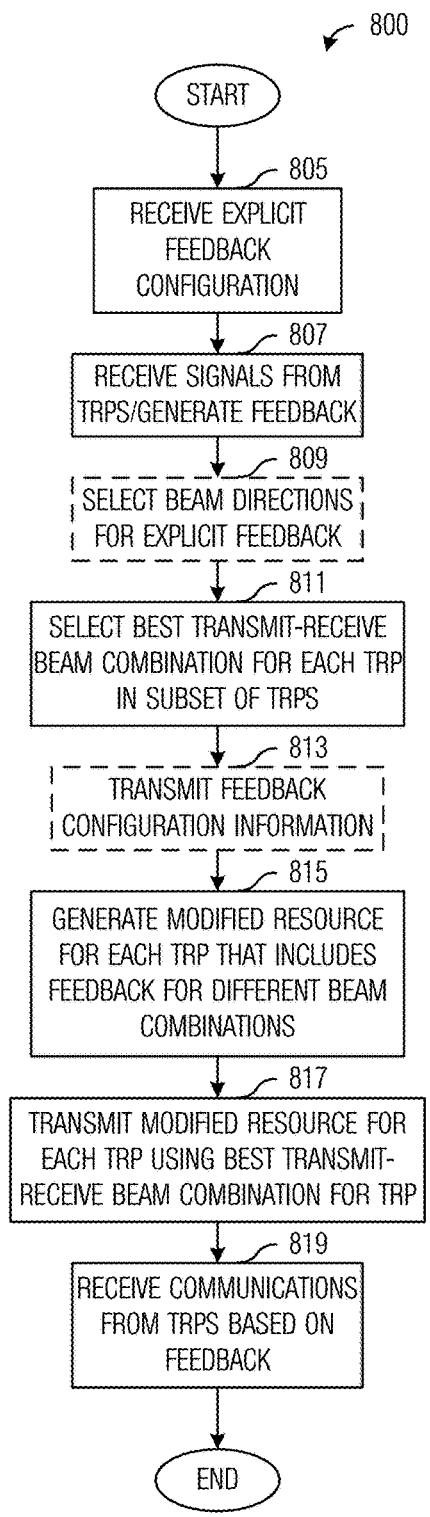
FIG. 8 illustrates a flow diagram of example operations occurring in a UE providing feedback to a subset of TRPs of a MP set of the UE according to example embodiments described herein.

FIG. 8 illustrates a flow diagram of example operations 800 occurring in a UE providing feedback to a subset of TRPs of a MP set of the UE. Operations 800 may be indicative of operations occurring in a UE as the UE provides feedback to a subset of TRPs of a MP set of the UE. For each TRP in the subset of TRPs, the UE uses explicit feedback to enable the transmission of explicit feedback associated with multiple TRBCs on a single TRBC.

Operations 800 begin with the UE receiving explicit feedback configuration information (block 805). The explicit feedback configuration information may include TRP and/or UE specific configuration parameters as discussed above to inform the UE how and when to report the feedback. The explicit feedback configuration information may specify which TRP communications beams the UE is to generate feedback for, a set of possible TRP communications beams that the UE may generate feedback for, a maximum number of TRP communications beams that the UE may generate feedback for, a maximum number of UE beams that the UE may use to generate feedback, and so forth. The explicit feedback configuration information may be received from each TRP to which the UE will be reporting the feedback, a single TRP (e.g., the master TRP) of the MP set, or a legacy macro eNB in a dual connectivity deployment. Alternatively, the explicit feedback configuration information may be received from a network device (such as another TRP, a communications controller, a dedicated entity, and so forth) that configures feedback operation. The UE receives signals (e.g., reference signals) from the TRPs of the MP set and generates feedback in accordance with the received signals (block 807). The UE receives signals from every TRP in the MP set, even from the TRPs that the UE will not be reporting the feedback to. If the UE has information that provides relative position information regarding the location of the UE with respect to the TRPs, the UE may be able to reduce a number of UE communications beams that the UE uses to receive the signals from the TRPs. The information may be derived from previously received transmissions from the TRPs, historical information, location information provided by the communications system, and so on. If the UE does not have any information to help locate the TRPs, the UE may have to sweep through all of the UE communications beams while receiving signals from the TRPs. The feedback generated from the received signals may include channel responses, channel quality indicators, channel state information, received signal strength indicators, SNRs, SINRs, and so forth.

The UE may select communications beam directions for explicit feedback (block 809). Communications beams corresponding to the selected communications beam directions may be used to determine TRBCs for which the UE will report feedback. The UE may select communications beam directions for every TRP in the MP set. The UE selects UE communications beams, and potentially TRP communications beams, for explicit feedback. The UE selects one or more UE communications beams that were able to receive signals from the TRPs with received signal strengths (or some other indicator of channel quality) that exceed a threshold, for example. Alternatively, the UE may be told which UE communications beams to use. As an example, the explicit feedback configuration includes information regarding which UE communications beams to use. Depending upon the configuration, the UE may select TRP communications beams for every TRP. As an example, in one configuration, the UE is able to select any of the TRP communications beams from each of the TRPs. While in another configuration, for each TRP, the UE is restricted to selecting TRP communications beams out of a set of TRP communications beams indicated to the UE. In yet another configuration, the UE is not allowed to select any TRP communications beams of any TRP and the UE is informed by the TRPs which TRP communications beams to report. The UE selects a best TRBC for each TRP in the subset of TRPs (block 811). The UE may select the best TRBC in accordance with the feedback generated from the received signals. As an illustrative example, a TRBC with the best channel quality feedback, highest SNR, highest SINR, strongest received signal strength, and so on, is selected as the best TRBC.

The UE may transmit feedback configuration information (block 813). As an example, in a situation where the UE is permitted to select TRP communications beams for each TRP, the UE transmits indications of the selected TRP communications beams, which may for instance be transmitted using uplink control channel (i.e., PUCCH). In a situation where the UE reports explicit channel feedback to the subset of TRPs, the feedback configuration information also information about the arrangement of the explicit feedback. As an example, the feedback configuration information includes information about which TRPs will only receive explicit channel feedback for its own TRBCs, as well as which TRPs will receive explicit channel feedback for TRBCs of other TRPs. In the situation where a TRP will receive explicit channel feedback for multiple TRPs, the feedback configuration information will also include information about the configuration of the explicit channel feedback to allow the TRP receiving the explicit channel feedback to determine which feedback is its own and which feedback is intended for other TRPs. As an illustrative example, if the UE is reporting explicit channel feedback for all TRPs to a single TRP, the feedback configuration information will include information about the configuration of the explicit channel feedback to enable the single TRP to provide the correct feedback to the other TRPs. As an illustrative example, if the UE is reporting explicit channel feedback to each TRP, the feedback configuration information provided to each TRP will include only information about the select TRP communications beams of the particular TRP.

The UE generates a modified resource including the explicit feedback for the different TRBCs for each TRP in the subset of TRPs (block 815). The modified resource may be a modified uplink PRB or a modified SRS resource, depending upon the configuration information received by the UE. The modified resource includes feedback for the best TRBC, as well as feedback for other TRBCs measured and generated by the UE from the received signals. The modified resource may include feedback for more than one TRP. The UE transmits each modified resource to an associated TRP using a best TRBC for the associated TRP (block 817). The UE receives communications from the TRPs based on the feedback (block 819).

FIG. 9 illustrates a flow diagram of example operations 900 occurring in a TRP as the TRP communicates with a UE, where the TRP is part of a subset of TRPs configured to receive feedback from the UE. Operations 900 may be indicative of operations occurring in a TRP that is communicating with a UE, where the TRP is part of a subset of TRPs configured to receive feedback from the UE. The communications between the TRP and the UE is in accordance with explicit feedback provided by the UE, which includes feedback with multiple TRBCs on a single TRBC. The explicit feedback provided by the UE may include feedback for other TRPs.

Operations 900 may begin with the TRP transmitting explicit feedback configuration information to the UE (block 905). The TRP transmits the explicit feedback configuration information in a configuration where the TRP is a master TRP or if all TRPs are configured to transmit explicit feedback configuration information to the UE. The configuration information may include TRP and/or UE specific configuration parameters as discussed above to inform the UE how and when to report the feedback. In an alternative embodiment, the configuration information is transmitted by a network device (other than the TRP), which may be another TRP, a communications controller, a dedicated entity, and so forth, that configures the feedback operation. The TRP may transmit signals (block 907). The signals may be reference signals. The signals are intended to be received by the UE and used to make measurements of channels between the TRP and the UE. In a situation where the UE is configured or instructed about which UE communications beams to use, the UE may not need to make measurements of the channels between the TRP and the UE, therefore, the TRP may not have to transmit signals to allow the UE to make the measurements because it already knows which UE communications beams to use.

The TRP receives feedback configuration information (block 909). The feedback configuration information may be dependent on the number of TRPs receiving the explicit channel feedback as discussed previously. The feedback configuration information may include the TRP communications beams selected by the UE. The feedback configuration may include information for other TRPs. The TRP receives a modified resource including feedback (block 911). The modified resource may be a modified uplink PRB resource or a modified SRS resource, depending upon the configuration information. The modified resource is received on a single TRBC that is selected by the UE and/or TRP as a transmit-beam combination that is the best of available TRBCs. Although the modified resource is received on the best TRBC, the feedback included in the modified resource includes explicit channel feedback for multiple TRBCs. The modified resource may include feedback for other TRPs. The TRP processes the modified resource (block 913). The TRP processes the modified resource to obtain the feedback, for example. The feedback may include channel responses, channel quality indicators, channel state information, received signal strength indicators, SNRs, SINRs, and so forth. If the modified resource includes feedback for other TRPs, the TRP shares the feedback with the other TRPs (block 915). The TRP communicates with the UE based on the feedback (block 917).

FIG. 10 illustrates a flow diagram of example operations 1000 occurring in a TRP as the TRP communicates with a UE, where the TRP is not part of a subset of TRPs configured to receive feedback from the UE. Operations 1000 may be indicative of operations occurring in a TRP that is communicating with a UE, where the TRP is not part of a subset of TRPs configured to receive feedback from the UE. The communications between the TRP and the UE is in accordance with explicit feedback provided by the UE, which includes feedback with multiple TRBCs on a single TRBC.

Operations 100 begin with the TRP transmitting signals (block 1005). The signals may be reference signals. The signals are intended to be received by the UE and used to make measurements of channels between the TRP and the UE. The TRP receives feedback (block 1007). The feedback may be received from another TRP that is also part of a MP set of the TRP, but the other TRP is configured to receive feedback from the UE. The TRP communicates with the UE based on the feedback (block 1009).

In a first aspect, the present application provides a method for transmitting feedback in a MP deployment. The method includes receiving, by a user device, feedback configuration information for explicit channel feedback for a plurality of TRBCs between the user device and TRPs of a MP set associated with the user device, generating, by the user device, the explicit channel feedback for the plurality of TRBCs, generating, by the user device, at least one modified uplink resource for each TRP in a subset of the TRPs of the MP set, the modified uplink resources are generated in accordance with the feedback configuration information, the modified uplink resources are configured to convey the explicit channel feedback to the subset of TRPs of the MP set, and transmitting, by the user device, the modified uplink resources to the subset of the TRPs of the MP set, where the at least one modified uplink resource associated with a TRP in the subset of the TRPs is transmitted to the TRP using a single TRBC.

According to a first embodiment of the method according to the first aspect, the method includes transmitting, by the user device, feedback configuration information to each TRP in the subset of the TRPs, the feedback configuration information including a user device communications beam to TRP communications beam mapping for the TRP. According to a second embodiment of the method according to any preceding embodiment of the first aspect or the first aspect as such, when the subset of the TRPs is smaller than a total number of TRPs in the MP set, the feedback configuration information for at least one TRP in the subset of the TRPs includes a user device communications beam to TRP communications beam mapping for more than one TRP. According to a third embodiment of the method according to any preceding embodiment of the first aspect or the first aspect as such, the feedback configuration information is received from one of: a master TRP of the MP set, one of the TRPs of the MP set, a legacy macro evolved NodeB (eNB) in a dual-connectivity deployment, a low frequency eNB, more than one of the TRPs of the MP set, or a master gNode B (MgNB).

According to a fourth embodiment of the method according to any preceding embodiment of the first aspect or the first aspect as such, when the feedback configuration information is received from more than one of the TRPs of the MP set, the method further includes applying, by the user device, one or more precedence rules to the feedback configuration information to determine an ordering of the feedback configuration information. According to a fifth embodiment of the method according to any preceding embodiment of the first aspect or the first aspect as such, the modified uplink resources are one of a modified sounding reference signal (SRS) resource or a modified uplink physical resource block (PRB). According to a sixth embodiment of the method according to any preceding embodiment of the first aspect or the first aspect as such, the feedback configuration information indicates a number of receive communications beams at the user device for which the user device is to generate explicit channel feedback for each TRP in the MP set. According to a seventh embodiment of the method according to any preceding embodiment of the first aspect or the first aspect as such, the feedback configuration information further indicates, for each TRP in the MP set, one of a first set of transmit communications beams of the TRP for which the user device is able to selectively generate explicit channel feedback or a second set of transmit communications beams of the TRP from which the user device must generate channel feedback.

According to an eighth embodiment of the method according to any preceding embodiment of the first aspect or the first aspect as such, when the feedback configuration information further indicates, for each TRP in the MP set, a first set of transmit communications beams of the TRP from which the user device is able to selectively generate channel feedback, the method further includes transmitting, by the user device, feedback configuration information including, for each TRP in the MP set, one or more transmit communications beams of the TRP selected by the user device. According to a ninth embodiment of the method according to any preceding embodiment of the first aspect or the first aspect as such, the feedback configuration information further indicates a set of receive communications beams at the user device for which the user device is to generate explicit channel feedback for each TRP in the MP set.

In a second aspect, the present application provides a method for operating a TRP operating in a MP set. The method includes receiving, by the TRP, at least one modified uplink resource over a single TRBC, the modified uplink resource conveying explicit channel feedback associated with a first plurality of TRBCs between a user device and the TRP, and processing, by the TRP, the at least one modified uplink resource to produce channel feedback.

According to a first embodiment of the method according to the second aspect, when the modified uplink resource further conveys explicit channel feedback associated with a second plurality of TRBCs between the user device and at least one other TRP, the method further includes forwarding, by the TRP, channel feedback associated with the at least one other TRP to the at least one other TRP. According to a second embodiment of the method according to any preceding embodiment of the second aspect or the second aspect as such, the method also includes receiving, by the TRP, feedback configuration information including a user device selection of TRP communications beam mapping for the TRP. According to a third embodiment of the method according to any preceding embodiment of the second aspect or the second aspect as such, rocessing the at least one modified uplink resource is in accordance with the user device selection of TRP communications beam mapping.

According to a fourth embodiment of the method according to any preceding embodiment of the second aspect or the second aspect as such, the method also includes transmitting, by the TRP, feedback configuration information indicating a number of receive communications beams of the user device for which the user device is to generate explicit channel feedback. According to a fifth embodiment of the method according to any preceding embodiment of the second aspect or the second aspect as such, the feedback configuration information further indicates, for each one of the TRP, one of a first set of transmit communications beams of the TRP to select from when generating explicit channel feedback or a second set of transmit communications beams of the TRP to generate channel feedback for. According to a sixth embodiment of the method according to any preceding embodiment of the second aspect or the second aspect as such, the feedback configuration information additionally signals a set of receive communications beams at the user device for which the user device is to generate explicit channel feedback for each TRP in the MP set.

In a third aspect, the present application provides a user device adapted to transmit feedback in a MP deployment. The user device includes a processor, and a computer readable storage medium storing programming for execution by the processor. The programming including instructions to configure the user device to receive feedback configuration information for explicit channel feedback for a plurality of TRBCs between the user device and TRPs of a MP set associated with the user device, generate the explicit channel feedback for the plurality of TRBCs, generate at least one modified uplink resource for each TRP in a subset of the TRPs of the MP set, the modified uplink resources are generated in accordance with the feedback configuration information, the modified uplink resources are configured to convey the explicit channel feedback to the subset of TRPs of the MP set, and transmit the modified uplink resources to the subset of the TRPs of the MP set, where the at least one modified uplink resource associated with a TRP in the subset of the TRPs is transmitted to the TRP using a single TRBC.

According to a first embodiment of the user device according to the third aspect, the programming includes instructions to configure the user device to transmit feedback configuration information to each TRP in the subset of the TRPs, the feedback configuration information including a user device communications beam to TRP communications beam mapping for the TRP. According to a second embodiment of the user device according to any preceding embodiment of the third aspect or the third aspect as such, the feedback configuration information indicates a number of receive communications beams at the user device for which the user device is to generate explicit channel feedback for each TRP in the MP set. According to a third embodiment of the user device according to any preceding embodiment of the third aspect or the third aspect as such, the feedback configuration information further indicates, for each TRP in the MP set, one of a first set of transmit communications beams of the TRP for which the user device is able to selectively generate explicit channel feedback or a second set of transmit communications beams of the TRP from which the user device must generate channel feedback. According to a fourth embodiment of the user device according to any preceding embodiment of the third aspect or the third aspect as such, the feedback configuration information further indicates, for each TRP in the MP set, a first set of transmit communications beams of the TRP from which the user device is able to selectively generate channel feedback, and wherein the programming includes instructions to configure the user device to transmit feedback configuration information including, for each TRP in the MP set, one or more transmit communications beams of the TRP selected by the user device.

In a fourth aspect, the present application provides a TRP operating in a MP deployment. The TRP includes a processor, and a computer readable storage medium storing programming for execution by the processor. The programming including instructions to configure the TRP to receive at least one modified uplink resource over a single TRBC, the modified uplink resource conveying explicit channel feedback associated with a first plurality of TRBCs between a user device and the TRP, and process the at least one modified uplink resource to produce channel feedback.

According to a first embodiment of the TRP according to the fourth aspect, the programming includes instructions to configure the TRP to receive feedback configuration information including a user device selection of TRP communications beam mapping for the TRP. According to a second embodiment of the TRP according to any preceding embodiment of the fourth aspect or the fourth aspect as such, the programming includes instructions to configure the TRP to transmit feedback configuration information indicating a number of receive communications beams of the user device for which the user device is to generate explicit channel feedback. According to a third embodiment of the TRP according to any preceding embodiment of the fourth aspect or the fourth aspect as such, when the modified uplink resource further conveys explicit channel feedback associated with a second plurality of TRBCs between the user device and at least one other TRP, the programming includes instructions to configure the TRP to forward channel feedback associated with the at least one other TRP to the at least one other TRP.

Figure 11:
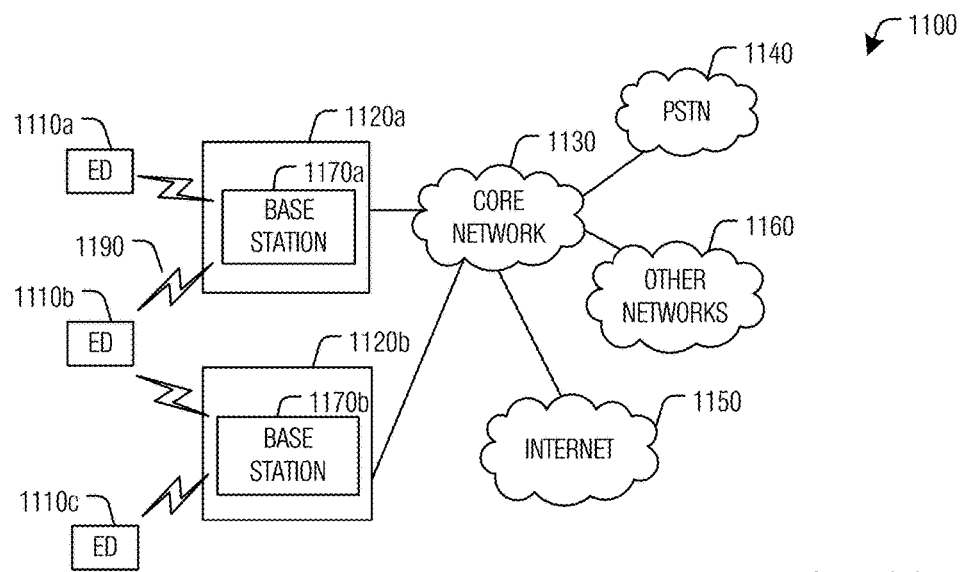
FIG. 11 illustrates an example communication system according to example embodiments described herein.

FIG. 11 illustrates an example communication system 1100. In general, the system 1100 enables multiple wireless or wired users to transmit and receive data and other content. The system 1100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 11, any number of these components or elements may be included in the system 1100.

The EDs 1110a-1110c are configured to operate and/or communicate in the system 1100. For example, the EDs 1110a-1110c are configured to transmit and/or receive via wireless or wired communication channels. Each ED 1110a-1110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1120a-1120b here include base stations 1170a-1170b, respectively. Each base station 1170a-1170b is configured to wirelessly interface with one or more of the EDs 1110a-1110c to enable access to the core network 1130, the PSTN 1140, the Internet 1150, and/or the other networks 1160. For example, the base stations 1170a-1170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1110a-1110c are configured to interface and communicate with the Internet 1150 and may access the core network 1130, the PSTN 1140, and/or the other networks 1160.

In the embodiment shown in FIG. 11, the base station 1170a forms part of the RAN 1120a, which may include other base stations, elements, and/or devices. Also, the base station 1170b forms part of the RAN mob, which may include other base stations, elements, and/or devices. Each base station 1170a-1170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1170a-1170b communicate with one or more of the EDs 1110s-1110c over one or more air interfaces 1190 using wireless communication links. The air interfaces 1190 may utilize any suitable radio access technology.

It is contemplated that the system 1100 may use multiple channel access functionality, including such schemes as described above. In particular embodiments, the base stations and EDs implement LTE, LTE-A, LTE-B, LTE-C and/or 5G. Of course, other multiple access schemes and wireless protocols may be utilized.

The RANs 1120a-1120b are in communication with the core network 1130 to provide the EDs 1110a-1110c with voice, data, application, Voice over Internet Protocol (VoIP), or other services. Understandably, the RANs 1120a-1120b and/or the core network 1130 may be in direct or indirect communication with one or more other RANs (not shown). The core network 1130 may also serve as a gateway access for other networks (such as the PSTN 1140, the Internet 1150, and the other networks 1160). In addition, some or all of the EDs 1110a-1110c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1150.

Although FIG. 11 illustrates one example of a communication system, various changes may be made to FIG. 11. For example, the communication system 1100 could include any number of EDs, base stations, networks, or other components in any suitable configuration.

Figure 12A:
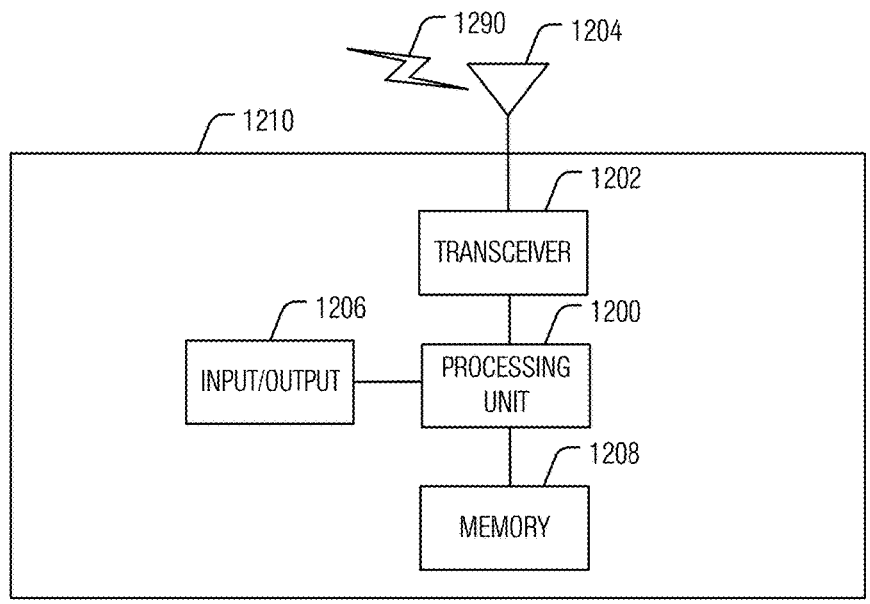
FIGS. 12A and 12B illustrate example devices that may implement the methods and teachings according to this disclosure.
Figure 12B:
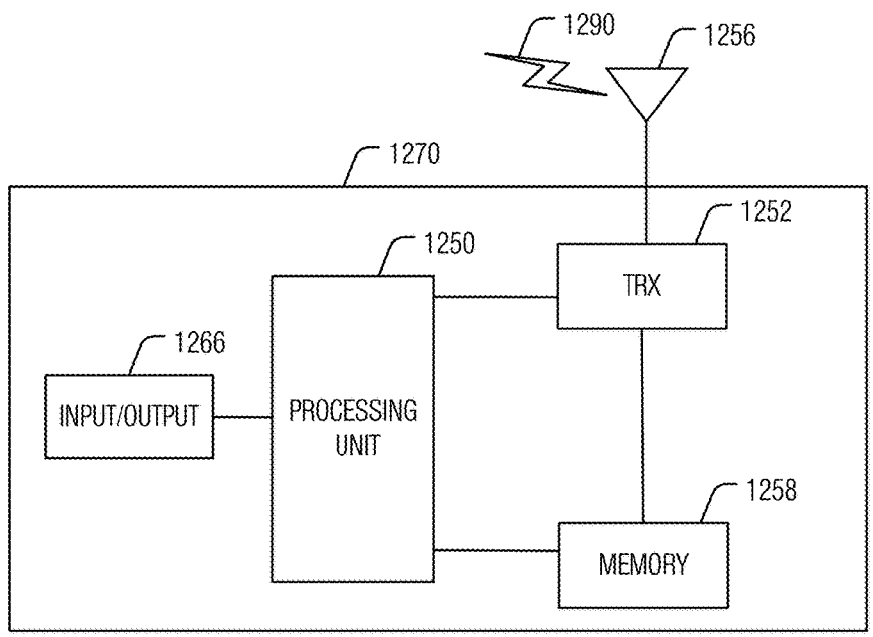

FIGS. 12A and 12B illustrate example devices that may implement the methods and teachings according to this disclosure. In particular, FIG. 12A illustrates an example ED 1210, and FIG. 12B illustrates an example base station 1270. These components could be used in the system 1100 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the system 1100. The processing unit 1200 also supports the methods and teachings described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless or wired transmission and/or processing signals received wirelessly or by wire. Each antenna 1204 includes any suitable structure for transmitting and/or receiving wireless or wired signals. One or multiple transceivers 1202 could be used in the ED 1210, and one or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the Internet 1150). The input/output devices 1206 facilitate interaction with a user or other devices (network communications) in the network. Each input/output device 1206 includes any suitable structure for providing information to or receiving/providing information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software or firmware instructions executed by the processing unit(s) 1200 and data used to reduce or eliminate interference in incoming signals. Each memory 1208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1250, at least one transceiver 1252, which includes functionality for a transmitter and a receiver, one or more antennas 1256, at least one memory 1258, and one or more input/output devices or interfaces 1266. A scheduler, which would be understood by one skilled in the art, is coupled to the processing unit 1250. The scheduler could be included within or operated separately from the base station 1270. The processing unit 1250 implements various processing operations of the base station 1270, such as signal coding, data processing, power control, input/output processing, or any other functionality. The processing unit 1250 can also support the methods and teachings described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transceiver 1252 includes any suitable structure for generating signals for wireless or wired transmission to one or more EDs or other devices. Each transceiver 1252 further includes any suitable structure for processing signals received wirelessly or by wire from one or more EDs or other devices. Although shown combined as a transceiver 1252, a transmitter and a receiver could be separate components. Each antenna 1256 includes any suitable structure for transmitting and/or receiving wireless or wired signals. While a common antenna 1256 is shown here as being coupled to the transceiver 1252, one or more antennas 1256 could be coupled to the transceiver(s) 1252, allowing separate antennas 1256 to be coupled to the transmitter and the receiver if equipped as separate components. Each memory 1258 includes any suitable volatile and/or non-volatile storage and retrieval device(s). Each input/output device 1266 facilitates interaction with a user or other devices (network communications) in the network. Each input/output device 1266 includes any suitable structure for providing information to or receiving/providing information from a user, including network interface communications.

Figure 13:
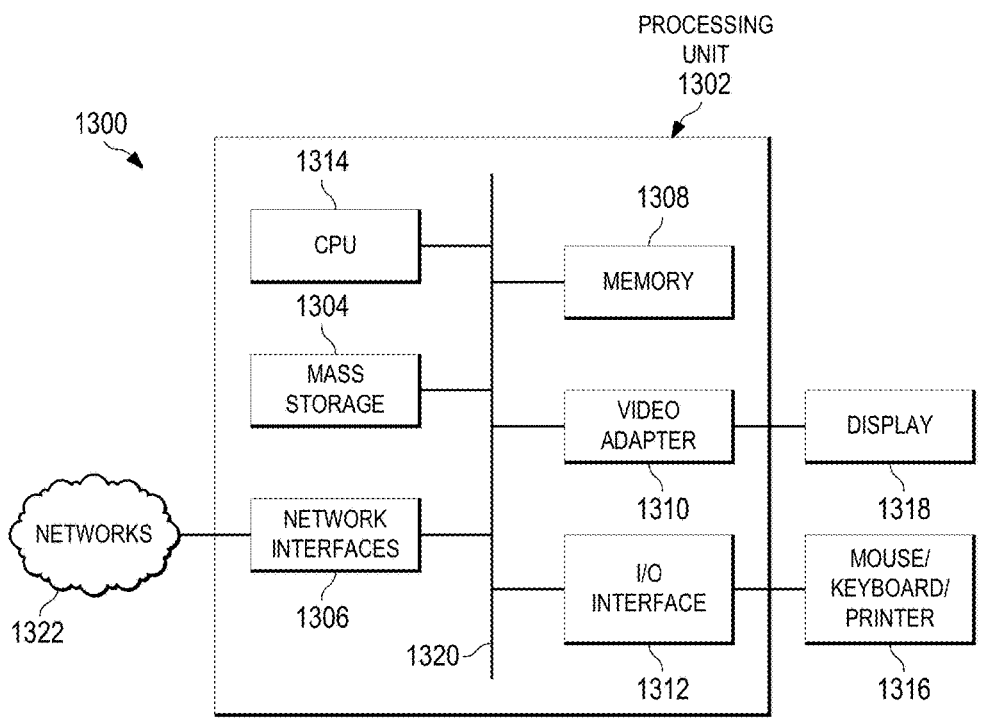
FIG. 13 is a block diagram of a computing system that may be used for implementing the devices and methods disclosed herein.

FIG. 13 is a block diagram of a computing system 1300 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. In an embodiment, the memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse/keyboard/printer 1316 coupled to the I/O interface 1312. Other devices may be coupled to the processing unit 1302, and additional or fewer interface cards may be utilized. For example, a serial interface such as Universal Serial Bus (USB) (not shown) may be used to provide an interface for an external device.

The processing unit 1302 also includes one or more network interfaces 1306, which may comprise wired links, such as an Ethernet cable, and/or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. In an embodiment, the processing unit 1302 is coupled to a local-area network 1322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a processing unit/module, and/or a forwarding unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for transmitting feedback in a multi-point (MP) deployment, the method comprising:
   receiving, by a user device, feedback configuration information for explicit channel feedback for a plurality of transmit beam-receive beam combinations (TRBCs) between the user device and transmit-receive points (TRPs) of an MP set associated with the user device;
   generating, by the user device, the explicit channel feedback for the plurality of TRBCs between the TRPs of the MP set and the user device, the explicit channel feedback being a representation of a complex downlink response of the TRBCs;
   generating, by the user device, at least one modified uplink resource for each TRP in a subset of the TRPs of the MP set, the modified uplink resources are generated in accordance with the feedback configuration information, the modified uplink resources are configured to convey the explicit channel feedback associated with each of the TRBCs to the subset of TRPs of the MP set; and
   transmitting, by the user device, the modified uplink resources to the subset of the TRPs of the MP set, where the at least one modified uplink resource associated with a TRP in the subset of the TRPs is transmitted to the TRP using a single TRBC.

2. The method of claim 1, further comprising transmitting, by the user device, second feedback configuration information to each TRP in the subset of the TRPs, the second feedback configuration information including a user device communications beam to TRP communications beam mapping for the TRP.

3. The method of claim 2, wherein the subset of the TRPs is smaller than a total number of TRPs in the MP set, and wherein the second feedback configuration information for at least one TRP in the subset of the TRPs comprises a user device communications beam to TRP communications beam mapping for more than one TRP.

4. The method of claim 1, wherein the feedback configuration information is received from one of: a master TRP of the MP set, one of the TRPs of the MP set, a legacy macro evolved NodeB (eNB) in a dual-connectivity deployment, a low frequency eNB, more than one of the TRPs of the MP set, or a master gNode B (MgNB).

5. The method of claim 4, wherein the feedback configuration information is received from more than one of the TRPs of the MP set, and wherein the method further comprises applying, by the user device, one or more precedence rules to the feedback configuration information to determine an ordering of the feedback configuration information.

6. The method of claim 1, wherein the modified uplink resources are one of a modified sounding reference signal (SRS) resource or a modified uplink physical resource block (PRB).

7. The method of claim 1, wherein the feedback configuration information indicates a number of receive communications beams at the user device for which the user device is to generate explicit channel feedback for each TRP in the MP set.

8. The method of claim 7, wherein the feedback configuration information further indicates, for each TRP in the MP set, one of a first set of transmit communications beams of the TRP for which the user device is able to selectively generate explicit channel feedback or a second set of transmit communications beams of the TRP from which the user device must generate channel feedback.

9. The method of claim 7, wherein the feedback configuration information further indicates, for each TRP in the MP set, a first set of transmit communications beams of the TRP from which the user device is able to selectively generate channel feedback, and wherein the method further comprises transmitting, by the user device, second feedback configuration information including, for each TRP in the MP set, one or more transmit communications beams of the TRP selected by the user device.

10. The method of claim 1, wherein the feedback configuration information further indicates a set of receive communications beams at the user device for which the user device is to generate explicit channel feedback for each TRP in the MP set.

11. A method for operating a transmit-receive point (TRP) operating in a multi-point (MP) set, the method comprising:
receiving, by the TRP, at least one modified uplink resource over a single transmit beam-receive beam combination (TRBC), the modified uplink resource conveying explicit channel feedback associated with a first plurality of TRBCs between a user device and the TRP, the explicit channel feedback being a representation of a complex downlink response of the TRBCs; and
processing, by the TRP, the at least one modified uplink resource to produce channel feedback.

12. The method of claim 11, wherein the modified uplink resource further conveys explicit channel feedback associated with a second plurality of TRBCs between the user device and at least one other TRP, and wherein the method further comprises forwarding, by the TRP, channel feedback associated with the at least one other TRP to the at least one other TRP.

13. The method of claim 11, further comprising receiving, by the TRP, feedback configuration information including a user device selection of TRP communications beam mapping for the TRP.

14. The method of claim 13, wherein processing the at least one modified uplink resource is in accordance with the user device selection of TRP communications beam mapping.

15. The method of claim 11, further comprising transmitting, by the TRP, feedback configuration information indicating a number of receive communications beams of the user device for which the user device is to generate explicit channel feedback.

16. The method of claim 15, wherein the feedback configuration information further indicates, for each one of the TRP, one of a first set of transmit communications beams of the TRP to select from when generating explicit channel feedback or a second set of transmit communications beams of the TRP to generate channel feedback for.

17. The method of claim 15, wherein the feedback configuration information additionally signals a set of receive communications beams at the user device for which the user device is to generate explicit channel feedback for each TRP in the MP set.

18. A user device adapted to transmit feedback in a multi-point (MP) deployment, the user device includes:
a processor; and
a computer readable storage medium storing programming for execution by the processor, the programming including instructions to configure the user device to:
receive feedback configuration information for explicit channel feedback for a plurality of transmit beam-receive beam combinations (TRBCs) between the user device and transmit-receive points (TRPs) of an MP set associated with the user device,
generate the explicit channel feedback for the plurality of TRBCs between the TRPs of the MP set and the user device, the explicit channel feedback being a representation of a complex downlink response of the TRBCs,
generate at least one modified uplink resource for each TRP in a subset of the TRPs of the MP set, the modified uplink resources are generated in accordance with the feedback configuration information, the modified uplink resources are configured to convey the explicit channel feedback associated with each of the TRBCs to the subset of TRPs of the MP set, and
transmit the modified uplink resources to the subset of the TRPs of the MP set, where the at least one modified uplink resource associated with a TRP in the subset of the TRPs is transmitted to the TRP using a single TRBC.

19. The user device of claim 18, wherein the programming includes instructions to configure the user device to transmit second feedback configuration information to each TRP in the subset of the TRPs, the second feedback configuration information including a user device communications beam to TRP communications beam mapping for the TRP.

20. The user device of claim 18, wherein the feedback configuration information indicates a number of receive communications beams at the user device for which the user device is to generate explicit channel feedback for each TRP in the MP set.

21. The user device of claim 20, wherein the feedback configuration information further indicates, for each TRP in the MP set, one of a first set of transmit communications beams of the TRP for which the user device is able to selectively generate explicit channel feedback or a second set of transmit communications beams of the TRP from which the user device must generate channel feedback.

22. The user device of claim 20, wherein the feedback configuration information further indicates, for each TRP in the MP set, a first set of transmit communications beams of the TRP from which the user device is able to selectively generate channel feedback, and wherein the programming includes instructions to configure the user device to transmit second feedback configuration information including, for each TRP in the MP set, one or more transmit communications beams of the TRP selected by the user device.

23. A transmit-receive point (TRP) operating in a multi-point (MP) deployment, the TRP includes:
a processor; and
a computer readable storage medium storing programming for execution by the processor, the programming including instructions to configure the TRP to:
receive at least one modified uplink resource over a single transmit beam-receive beam combination (TRBC), the modified uplink resource conveying explicit channel feedback associated with a first plurality of TRBCs between a user device and the TRP, the explicit channel feedback being a representation of a complex downlink response of the TRBCs, and
process the at least one modified uplink resource to produce channel feedback.

24. The TRP of claim 23, wherein the programming includes instructions to configure the TRP to receive feedback configuration information including a user device selection of TRP communications beam mapping for the TRP.

25. The TRP of claim 23, wherein the programming includes instructions to configure the TRP to transmit feedback configuration information indicating a number of receive communications beams of the user device for which the user device is to generate explicit channel feedback.

26. The TRP of claim 23, wherein the modified uplink resource further conveys explicit channel feedback associated with a second plurality of TRBCs between the user device and at least one other TRP, and wherein the programming includes instructions to configure the TRP to forward channel feedback associated with the at least one other TRP to the at least one other TRP.

* * * * *